United States Patent
Brodie et al.

(10) Patent No.: US 9,499,026 B2
(45) Date of Patent: Nov. 22, 2016

(54) VEHICULAR AIR-CONDITIONING SYSTEM WITH A SWITCHING HEAT EXCHANGER

(71) Applicant: DENSO International America, Inc., Southfield, MI (US)

(72) Inventors: Bradley R. Brodie, Milford, MI (US); Erik Philip Huyghe, Rochester Hills, MI (US); Masafumi Kurata, Kariya (JP)

(73) Assignee: DENSO International America, Inc., Southfield, MI (US)

( * ) Notice: Subject to any disclaimer, the term of this patent is extended or adjusted under 35 U.S.C. 154(b) by 618 days.

(21) Appl. No.: 14/027,508

(22) Filed: Sep. 16, 2013

(65) Prior Publication Data

US 2015/0075204 A1  Mar. 19, 2015

(51) Int. Cl.
| | | |
|---|---|---|
| B60H 1/03 | (2006.01) | |
| B60H 1/00 | (2006.01) | |
| F25B 6/04 | (2006.01) | |
| F25B 41/00 | (2006.01) | |
| F28D 1/053 | (2006.01) | |
| F28F 1/12 | (2006.01) | |
| F28D 21/00 | (2006.01) | |

(52) U.S. Cl.
CPC ...... *B60H 1/00907* (2013.01); *B60H 1/00335* (2013.01); *B60H 1/00914* (2013.01); *F25B 6/04* (2013.01); *F25B 41/003* (2013.01); *F25B 2339/00* (2013.01); *F25B 2400/0409* (2013.01); *F28D 1/05366* (2013.01); *F28D 2021/0084* (2013.01); *F28D 2021/0085* (2013.01); *F28F 1/126* (2013.01)

(58) Field of Classification Search
CPC ............... F25B 2400/0415; F25B 2400/0417; F25B 2339/0444; F25B 2339/0446; B60H 1/00914
See application file for complete search history.

(56) References Cited

U.S. PATENT DOCUMENTS

| | | | | |
|---|---|---|---|---|
| 2009/0241573 A1* | 10/2009 | Ikegami | ............. | B60H 1/00335 62/238.7 |
| 2011/0167849 A1* | 7/2011 | Kobayashi | ......... | B60H 1/00914 62/159 |
| 2013/0014523 A1* | 1/2013 | Kimura | .............. | B60H 1/00914 62/96 |

FOREIGN PATENT DOCUMENTS

JP  07-146029  6/1995

* cited by examiner

*Primary Examiner* — Cassey D Bauer
(74) *Attorney, Agent, or Firm* — Harness, Dickey & Pierce, P.L.C.

(57) ABSTRACT

An air-conditioning system for a vehicle includes a switching heat exchanger. The switching heat exchanger includes a heat exchanger core, a receiver tank, and a switch valve. The switch valve may be arranged between the heat exchanger core and the receiver tank to control the flow of refrigerant. A controller can be configured to control the switch valve in an access position during a cooling mode and a bypass position during a heating mode. In the access position, the heat exchanger core is in communication with the receiver tank such that the refrigerant flows from a primary region of the heat exchanger core to the receiver tank. In the bypass position, the heat exchanger core is in communication with its outlet such that the refrigerant from the primary region flows out from the switching heat exchanger.

7 Claims, 22 Drawing Sheets

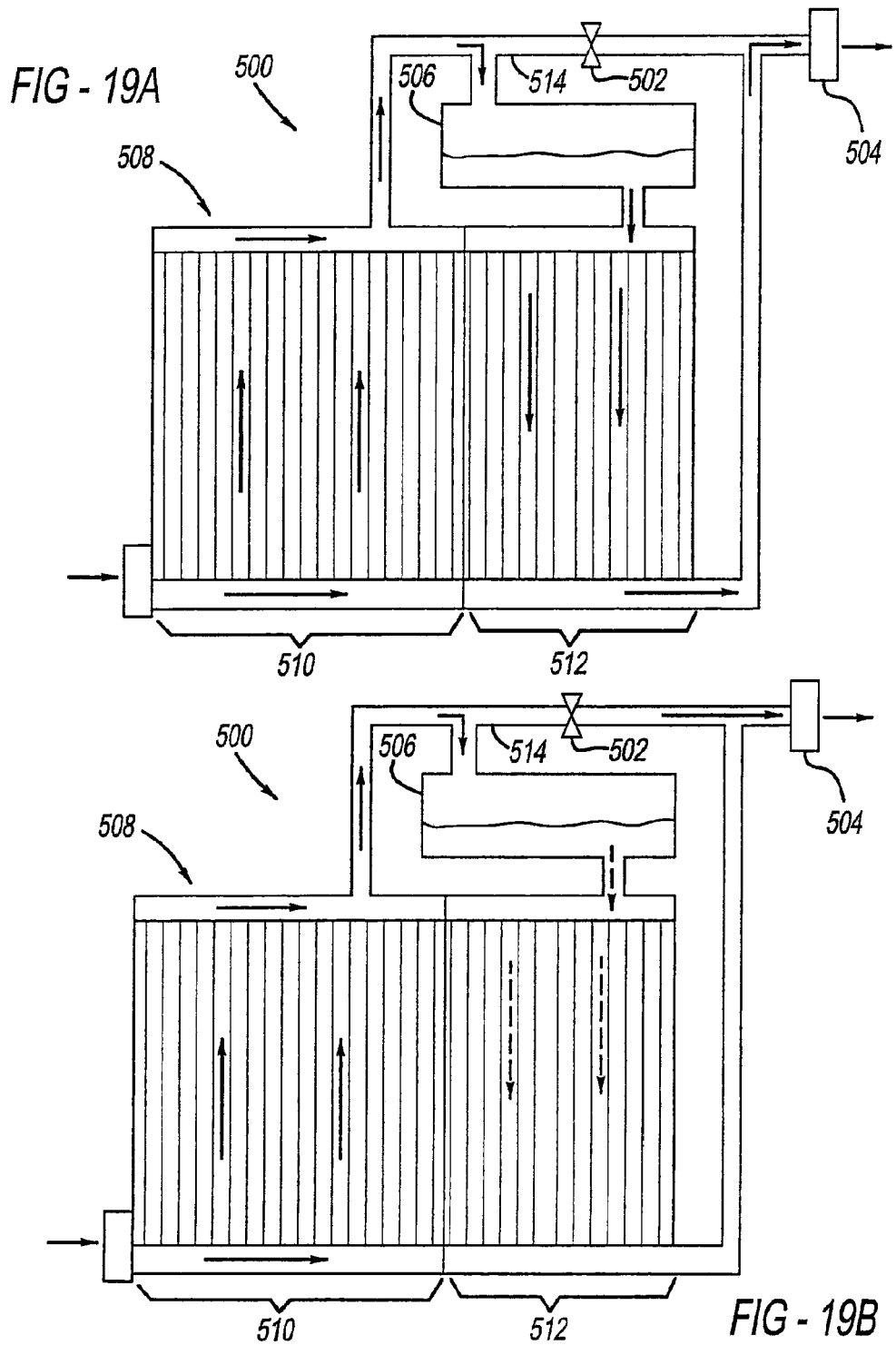

VEHICULAR AIR-CONDITIONING SYSTEM WITH A SWITCHING HEAT EXCHANGER

FIELD

The present disclosure relates to a vehicular air-conditioning system having a switching heat exchanger.

BACKGROUND

This section provides background information related to the present disclosure which is not necessarily prior art.

As plug-in hybrid electric vehicles (PHEV) and battery electric vehicles (BEV) grow in popularity, additional focus is being placed on making such vehicles more energy efficient. One area of focus is in regard to the energy used to heat and cool the passenger cabin of the vehicle.

For cooling, a typical vapor compression cycle based system, similar to that found on modern vehicles, is usually implemented. Such air-conditioning systems may include sub-cool condensers and internal heat exchangers to improve system efficiency and reduce the energy used to cool the passenger cabin.

Heating, however, can be a bit of a challenge. In particular, in a PHEV there is little to no wasted heat generated from an internal combustion engine to heat the passenger cabin, and a BEV has no internal combustion engine. Current techniques to overcome such issues may incorporate an electric heating element to heat the passenger cabin. For instance, a heater to heat the air directly or a heater used to heat water which is used to heat the cabin can be used. The problem with such design is that in the heating mode a PTC heater coefficient of performance (COP) cannot exceed 1. This means that if 5 kW of power is applied, 5 kW of heating can be achieved.

Alternatively, a heat pump system could also be used to heat the passenger cabin. With a heat pump system, a COP greater than 1 can be achieved in the heating mode, thereby saving energy. The heat pump system also utilizes the compressor and many other components that are already needed for the vehicle air-conditioning system. However, in a heat pump system, the outside heat exchanger is a condenser in the cooling mode and an evaporator in the heating mode. Therefore, the sub-cool section of the condenser is typically removed because it creates too much of a pressure drop in the heating mode. As a result, the efficiency of a sub-cool condenser during the cooling may not be realized.

SUMMARY

This section provides a general summary of the disclosure, and is not a comprehensive disclosure of its full scope or all of its features.

The present disclosure provides for an air-conditioning system for a vehicle that includes a switching heat exchanger and a controller. The switching heat exchanger can be disposed at a front portion of the vehicle, and includes a heat exchanger core, a receiver tank, and a switch valve.

The heat exchanger core exchanges heat between refrigerant flowing therein and air blowing through, and may have a primary region and a secondary region. An inlet of the receiver tank may communicate with the primary region of the heat exchanger core and an outlet of the receiver tank may communicate with the secondary region, such that the receiver tank receives refrigerant from the heat exchanger core via the primary region and provides refrigerant to the heat exchanger core via the secondary region. The switch valve may be arranged between the heat exchanger core and the receiver tank to control the flow of refrigerant.

The controller can be configured to control the switch valve to an access position during a cooling mode and a bypass position during a heating mode. In the access position, the switch valve opens a first passage to have the primary region of the heat exchanger core communicate with the receiver tank so that the refrigerant flows from the primary region to the receiver tank. From the receiver tank the refrigerant may flow to the secondary region before flowing out from an outlet of the heat exchanger core. In the bypass position, the switch valve opens a second passage to have the primary region of the heat exchanger core communicate with the outlet of the heat exchanger core so that the refrigerant flows from the primary region to the outlet of the heat exchanger core.

The present disclosure also provides that the switching heat exchanger may include a bypass tube that has one end coupled to the outlet of the heat exchanger core. The switch valve may be disposed at a junction between the receiver tank, the other end of the bypass tube, and the primary region of the heat exchanger core.

Accordingly, in the access position, the switch valve opens the first passage defined between the primary region and the receiver tank to have the refrigerant flow from the primary region to the receiver tank. In the bypass position, the switch valve opens the second passage defined between the primary region and the bypass tube to have the refrigerant flow from the primary region to the outlet of the heat exchanger core via the bypass tube.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 19A and 19B are perspective views of a switching heat exchanger in an eleventh embodiment of the air-conditioning system during the cooling mode and the heating mode, respectively;

Corresponding reference numerals indicate corresponding parts throughout the several views of the drawings.

DETAILED DESCRIPTION

Figure 1:
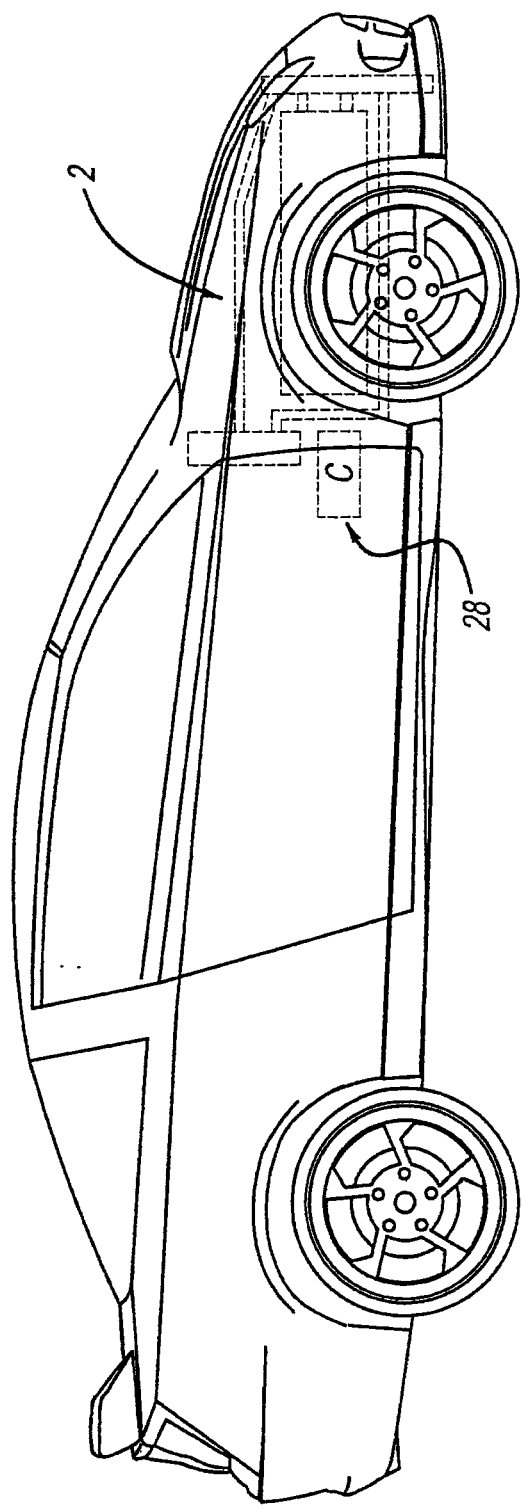
FIG. 1 is a representative vehicle including an air-conditioning system in accordance with the present disclosure.
Figure 2:
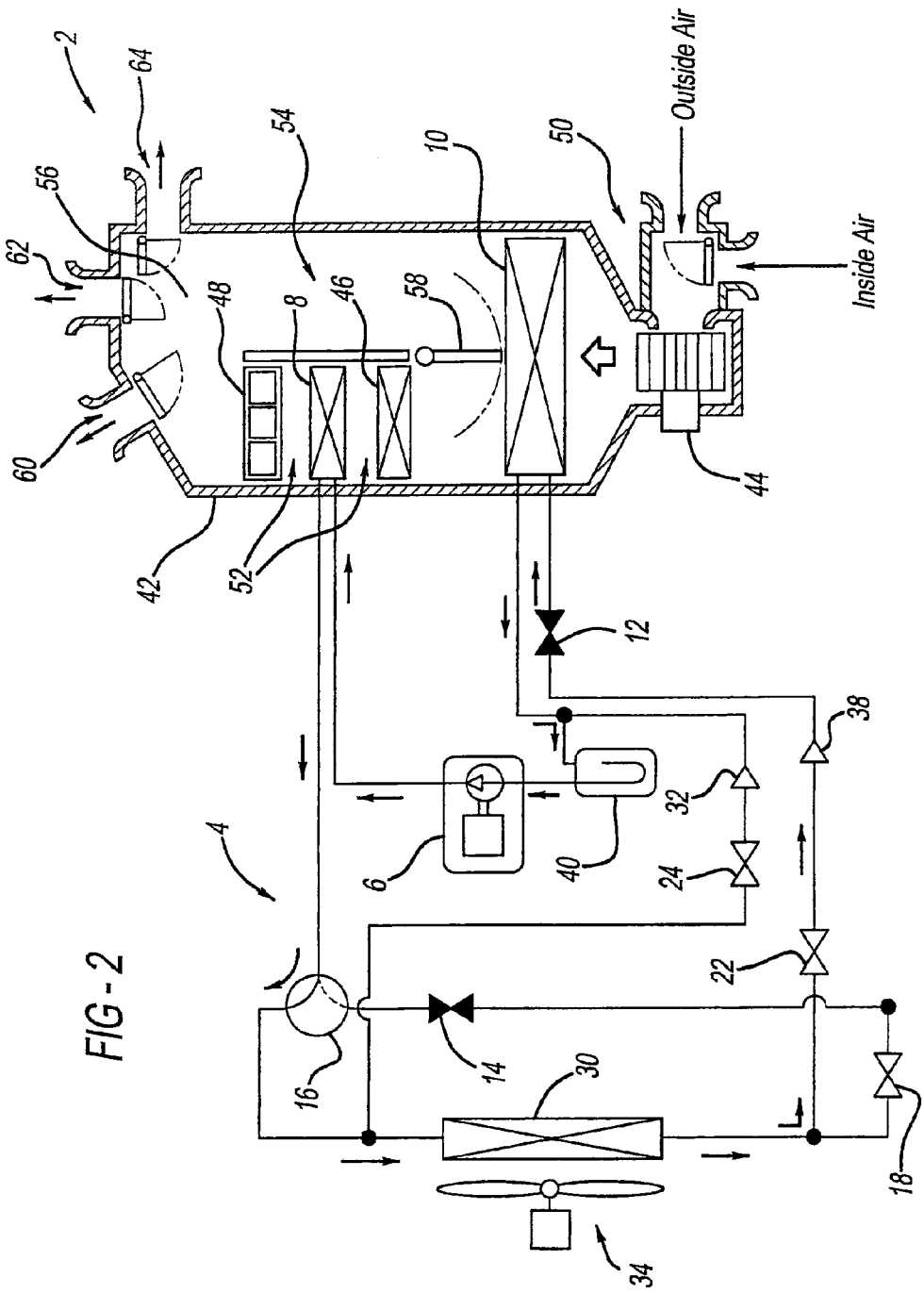
FIG. 2 is a schematic diagram of the air-conditioning system during a cooling mode.

Example embodiments will now be described more fully with reference to the accompanying drawings. With reference to FIGS. 1 and 2, an air-conditioning system 2 heats and cools a passenger cabin of a vehicle, which can be a plug-in hybrid electric vehicle (PHEV) or a battery electric vehicle (BEV). The system 2 utilizes a vapor compression refrigeration cycle 4 that switches between a cooling mode for cooling the passenger cabin and a heating mode for heating the passenger cabin. The vapor compression refrigeration cycle 4 performs like a heat pump system by transferring heat from one location to another location. Along with heating and cooling, the air-conditioning system 2 may perform other air conditioning modes, such as dehumidification.

The air-conditioning system 2 may include a compressor 6, an inner condenser 8, an inner evaporator 10, and a switching heat exchanger 30. In addition, a thermal expansion valve 12 and a fixed throttle 14 decompress and expand a refrigerant flowing in the air-conditioning system 2.

Figure 3:
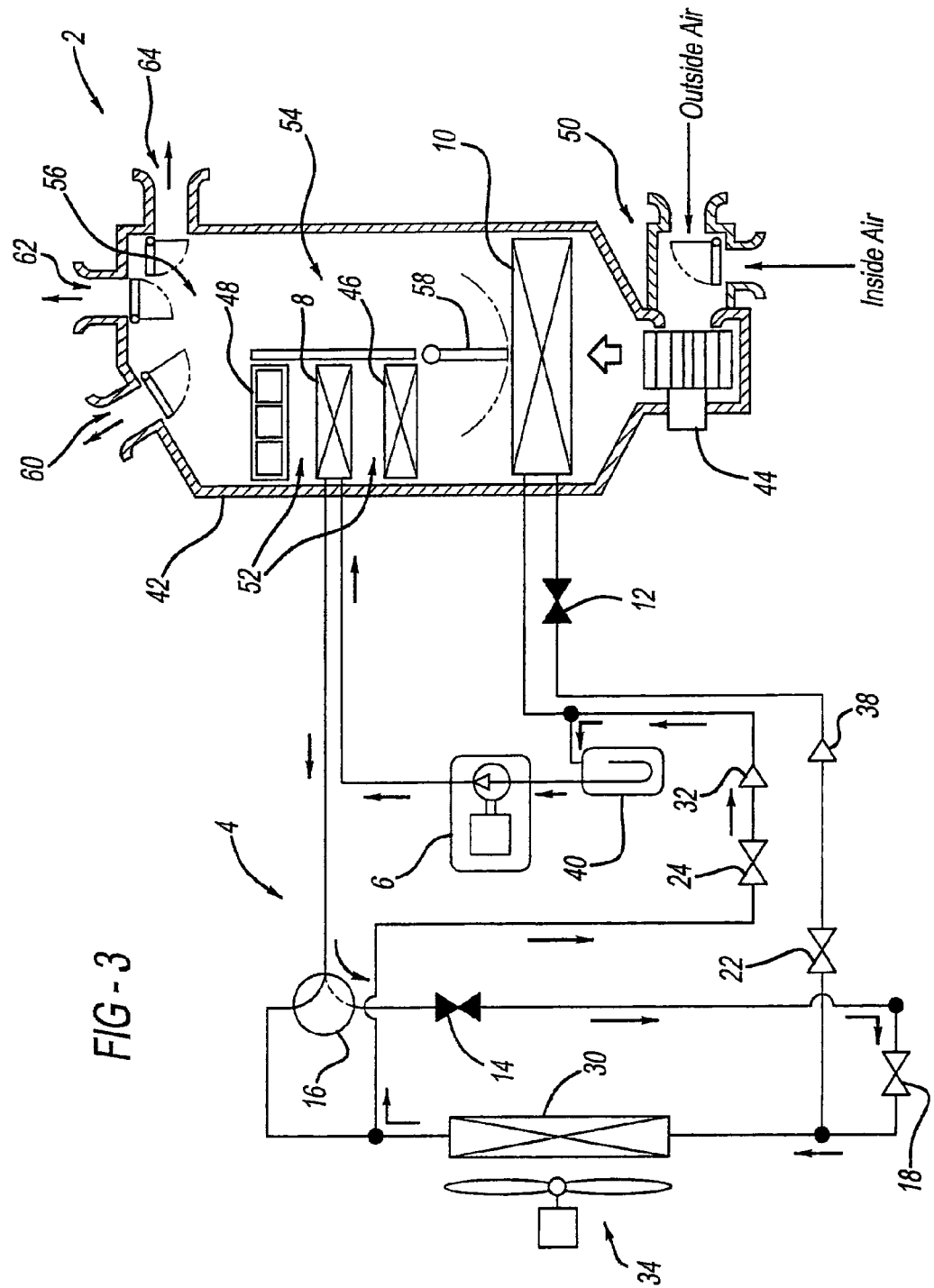
FIG. 3 is a schematic diagram of the air-conditioning system during a heating mode.

The vapor compression refrigeration cycle 4 differs for the cooling mode and the heating mode, as shown by the arrows in FIGS. 2 and 3, respectively. To control the direction of the refrigerant flowing through the system 2 for the different modes, a plurality of electromagnetic (EM) valves 16, 18, 22, 24 are provided. The state of the EM valves 16, 18, 22, 24 may be controlled by a controller (C) 28, which controls the air-conditioning system 2.

The compressor 6 sucks, compresses, and discharges the refrigerant into the refrigeration cycle 4. The compressor 6 may be an electric compressor that drives a fixed displacement compressor mechanism having a fixed charge capacity by way of an electric motor. Various types of compressors having a fixed displacement compressor mechanism, such as a scroll type compressor and a vane compressor, may be employed. The compressor 6 may also be a variable type compressor.

The compressor 6 is coupled to the inner condenser 8, such that the refrigerant flows from the compressor 6 to the inner condenser 8. The inner condenser 8 heats the air flowing from the evaporator 10 by transferring the heat from the refrigerant flowing therein to the air passing through.

The inner condenser 8 may be coupled to the electromagnetic valve 16. The EM valve 16 may be a three-way valve that directs the flow of refrigerant toward either the fixed throttle 14 or the switching heat exchanger 30. In an energized state, in which power is provided, the EM valve 16 directs the flow of refrigerant toward the fixed throttle 14. On the other hand, in a non-energized state in which power is not provided, the EM valve 16 directs the flow of refrigerant toward the switching heat exchanger 30. The EM valve 16 may also be switched by a stepper motor or another suitable actuator that does not consume power other than to change position of the EM valve 16.

The fixed throttle 14 decompresses and expands the refrigerant flowing therein. The fixed throttle 14 may be provided as a capillary tube or an orifice. Alternatively, the decompression and expansion performed by the fixed throttle 14 may be performed by an electric variable throttle mechanism, which has a throttle passage area that can be adjusted by the controller 28. The refrigerant flowing from the outlet of the fixed throttle 14 may be directed by the EM valves 18.

In the non-energized state, the EM valve 16 directs the flow of refrigerant toward the switching heat exchanger 30 and the EM valve 24. The EM valve 24 may be a low-voltage type of valve that is normally closed in the non-energized state. On the other hand, in the energized state the EM valve 24 is open to allow the refrigerant to flow towards the thermal expansion valve 12 via a first check valve 32 which prevents the refrigerant from flowing into the EM valve 24.

The switching heat exchanger 30 may be disposed in a front portion of the vehicle as an outer heat exchanger of the heat pump system. The switching heat exchanger 30 exchanges heat between the refrigerant flowing therein and the outside air being blown in from a fan 34. The fan 34 may be an electric blower. The controller 28 may control the fan 34 to regulate the amount of air being blown in by the fan 34.

The switching heat exchanger 30 may be coupled to the EM valves 18, 22, which direct the flow of refrigerant entering and leaving the switching heat exchanger 30. The EM valves 18, 22 may be normally open valves that are open during the non-energized state and are closed during the energized state.

The EM valve 22 further controls the flow of refrigerant into the thermal expansion valve 12 via a second check valve 38 disposed therebetween. The second check valve 38 only allows the refrigerant to flow from the EM valve 22 to the thermal expansion valve 12.

The inner evaporator 10 is disposed on an upstream side of air flow of the inner condenser 8. The inner evaporator 10 may be a heat exchanger that cools the air by transferring heat from the air passing through to the refrigerant flowing therein, thereby heating the refrigerant.

The outlet of the inner evaporator 10 is coupled to the thermal expansion valve 12. The thermal expansion valve 12 decompresses and expands the refrigerant flowing therein and then outputs the refrigerant from its outlet. For example, the thermal expansion valve 12 may be an internal pressure equalizing expansion valve that has the temperature sensor and a throttle mechanism. The thermal expansion valve 12 may also be a provided as a capillary tube or an orifice.

An accumulator 40 receives the refrigerant from the thermal expansion valve 12. The accumulator 40 may be a low pressure side vapor-liquid separator to separate the liquid and vapor form of the refrigerant flowing therein, and stores any excess refrigerant. The outlet of the accumulator 40 is coupled to a refrigerant suction port of the compressor 6, which extracts the vapor form of the refrigerant from the accumulator 40.

A housing 42 of the air-conditioning system 2 is disposed behind a dashboard or instrument panel of the vehicle, and houses a blower 44, the inner evaporator 10, the inner condenser 8, a heater core 46, and a PTC heater 48. The housing 42 further defines the air passages in which the air is conditioned before being blown into the passenger cabin. The housing 42 may be formed out of resin, such as polypropylene.

An incoming-air switch box 50 is formed on an upstream side of the blower 44. The incoming-air switch box 50 may select the source of the incoming air as either from outside of the vehicle or from the passenger cabin of the vehicle (i.e., inside air).

The blower 44 may blow or suck air from the incoming-air switch box 50 into the inner evaporator 10. The blower 44 may be an electric blower having a centrifugal multi-blade fan that is driven by an electric motor, and controlled by the controller 28.

The inner evaporator 10 is disposed downstream of the blower 44, and multiple air passages are positioned downstream of the inner evaporator 10. In particular, a heated air passage 52, a cooled air passage 54, and a mixed air passage 56 are provided downstream of the inner evaporator 10.

The heated air passage 52 is configured to heat the air flowing from the inner evaporator 10. In particular, the heater core 46, the inner condenser 8, and the PTC heater 48 may be arranged along the heated air passage 52 to heat the air flowing from the inner evaporator 10.

For a PHEV, the heater core 46 is a heat exchanger that heats air by exchanging the heat of coolant flowing therein with the air blown from the inner evaporator 10. The coolant flowing in the heater core 46 removes heat from the engine (not shown), and is then cooled in the heater core 46. Alternatively, for a PHEV and for a BEV which does not have an engine, the heater core 46 may be replaced with another source to warm the air, such as a heater to heat the air directly or a heater used to heat water which is used to heat the passenger cabin.

The PTC heater 48 may be an electric heater with a positive temperature coefficient (PTC) heating element that produces heat when supplied by power, thereby heating the air flowing from the inner condenser 8. The PTC heater 48 may include multiple heaters and can be controlled by the controller 28.

The cooled air passage 54 allows the air to bypass the heated air passage 52 so that the air flowing from the inner evaporator 10 flows directly into the mixed air passage 56. A door 58 controls the amount of air flowing into the heated air passage 52 and the cooled air passage 54, and thus controls the temperature of the air in the mixed air passage 56. The door 58 may be controlled by the controller 28.

The air provided in the mixed air passage 56 may then flow into outlets 60, 62, 64 which blow air into the passenger cabin of the vehicle toward, for example, the feet, the face, and the defroster, respectively. The temperature and the amount of air blown into the outlets 60, 62, 64 may be controlled by the controller 28.

The controller 28 may include a CPU, a RAM, and a ROM. The controller 28 receives information from various sensors disposed throughout the system 2 and from climate control gauges disposed on an instrument panel of the vehicle which are operated by a user. Based on such information, the controller 28 controls various components such as the incoming air switch box 50, the blower 44, and the PTC heater 48, to heat and cool the air entering the passenger cabin to the desired temperature. Further, by controlling the EM valves 16, 18, 22, 24, the controller 28 performs a switch control to switch between the cooling mode and the heating of the vapor compression refrigeration cycle 4.

Figure 4:
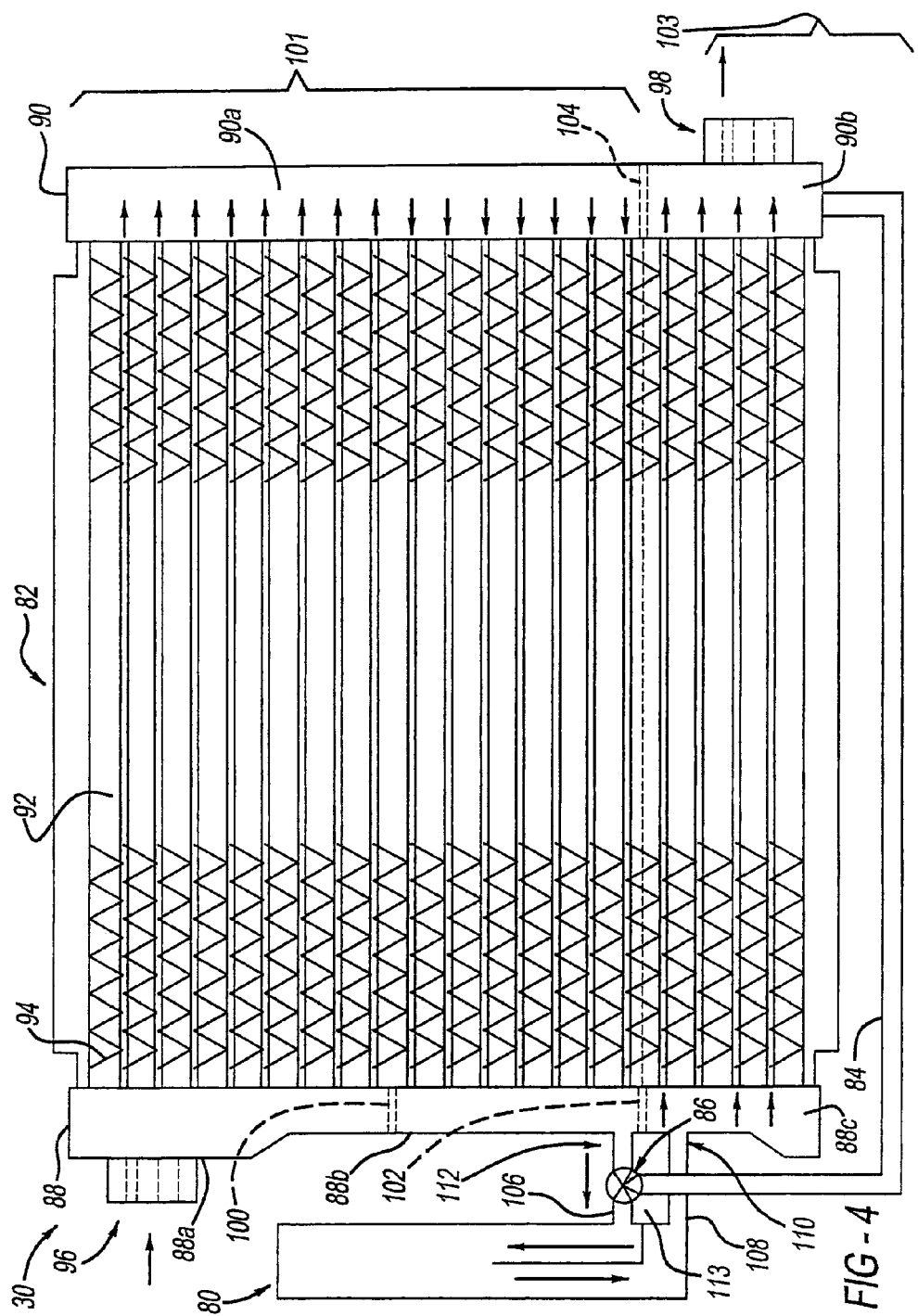
FIG. 4 is a perspective view of a switching heat exchanger in a first embodiment during the cooling mode of the air-conditioning system.
Figure 5:
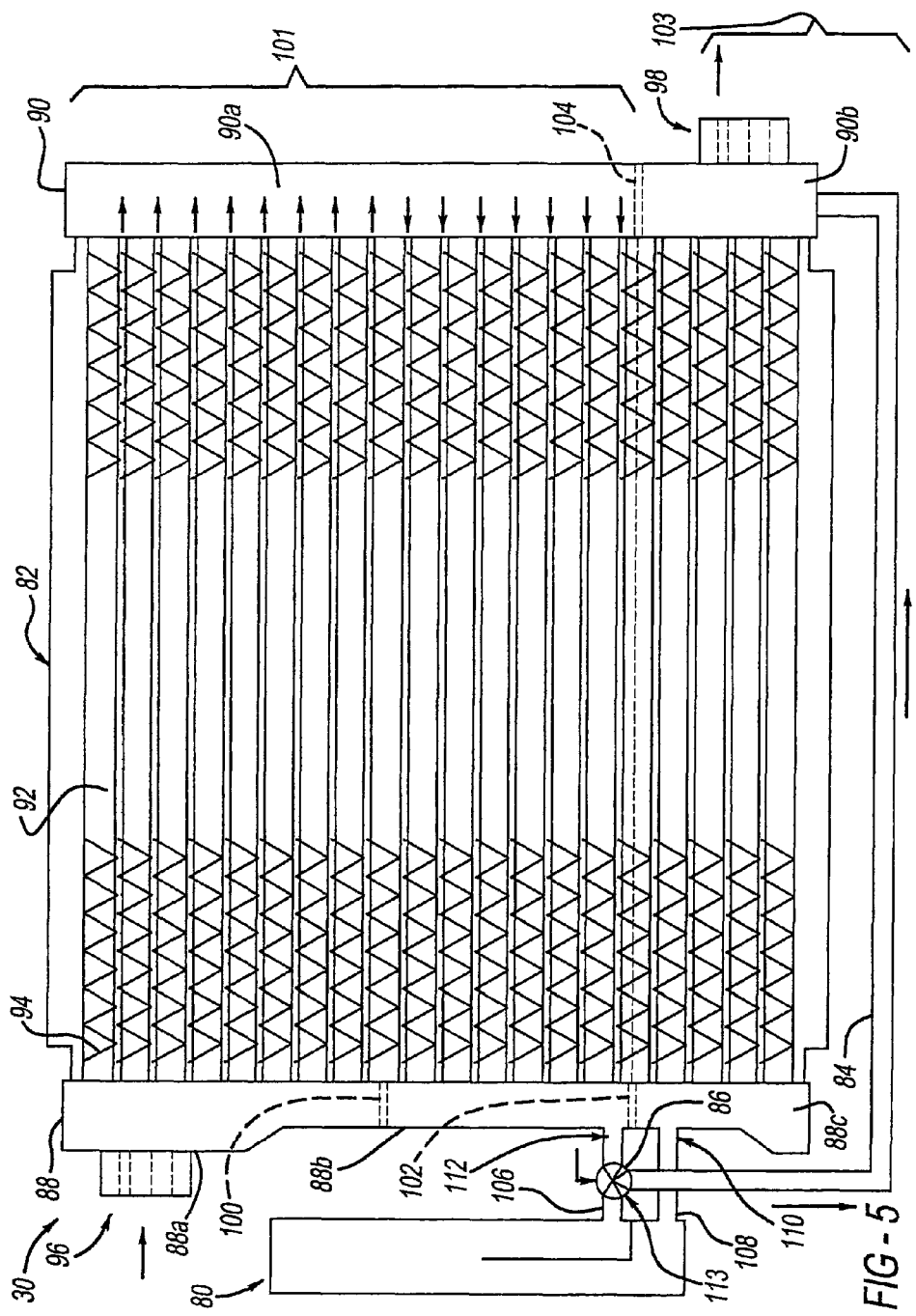
FIG. 5 is a perspective view of the switching heat exchanger of the first embodiment during the heating mode of the air-conditioning system.

With reference to FIGS. 4 and 5, a first embodiment of the switching heat exchanger 30 of the present disclosure will now be described. The switching heat exchanger 30 may include a receiver tank 80, a heat exchanger core 82, a bypass tube 84, and a switch valve 86.

The heat exchanger core 82 has a first header tank 88 and a second header tank 90, both of which may have a cylindrical shape. A plurality of flat tubes 92 are disposed horizontally between the first header tank 88 and the second header tank 90 such that one end of the flat tube. 92 is coupled to the first header tank 88 and the other end is coupled to the second header tank 90. A corrugated fin 94 is disposed between the flat tubes 92 in a heat transferring relationship. The heat exchanger core 82 may be multi-flow type condenser.

A core inlet 96 may be disposed at an upper portion of the first header tank 88, and a core outlet 98 may be disposed at a lower portion of the second header tank 90. The refrigerant flowing into the core inlet 96 flows between the first header tank 88 and the second header tank 90 through the flat tubes 92 in a serpentine fashion.

A first separator 100 and a second separator 102 may be disposed in the first header tank 88, and a third separator 104 may be disposed in the second header tank 90. The second separator 102 and the third separator 104 are disposed at the same level of the first header tank 88 and the second header tank 90, respectively. The first header tank 88 can be viewed as being divided into three sections 88*a*, 88*b*, 88*c* by the first separator 100 and the second separator 102, and the second header tank 90 can be viewed as being separated into two sections 90*a*, 90*b* by the third separator 104.

The portion of the heat exchanger core 82 above the second separator 102 and the third separator 104 is provided as a primary region 101. The portion of the heat exchanger core 82 below the second separator 102 and the third separator 104 is provided as a secondary region 103. Although the primary region 101 is shown as having two flow paths, the primary region may have one flow path or more than two flow paths. Further, the secondary region 103 may be identified as the last flow path of the heat exchanger core 82 and/or as the flow path provided after the receiver tank 80. As will be seen in the following, in the cooling mode, the switching heat exchanger 30 performs like a sub-cool condenser, whereas in the heating mode, it performs like an evaporator.

The receiver tank 80 separates the liquid and vapor form of the refrigerant flowing therein. A tank inlet 106 is positioned above the second separator 102 (the primary region 101). A tank outlet 108 is coupled to a sub-cool passage 110 defined below the second separator 102 (the secondary region 103). The receiver tank 80 can be arranged along the side of the first header tank 88, and may be fully integrated with the first header tank 88. For example, the receiver tank 80 may be soldered to the side surface of the first header tank 88 with the tank inlet extending therefrom to couple to the switch valve 86.

The bypass tube 84 may be an aluminum pipe that extends between the switch valve 86 and the core outlet 98. In particular, the bypass tube 84 directs the refrigerant from the first header tank 88 to the core outlet 98 where the refrigerant flows into the vapor compression refrigeration cycle 4 of the air-conditioning system 2.

The switch valve 86 can be a three-way electromagnetic valve, and may be controlled by the controller 28. The switch valve 84 may also be switched by a stepper motor or another suitable actuator that does not consume power other than to change position of the switch valve 86. The switch valve 86 is disposed at a junction 113 between the receiver tank 80, the heat exchanger core 82, and the bypass tube 84. Specifically, at the junction 113, the switch valve 86 is arranged between a valve passage 112 defined above the second separator 102 of the first header tank 88, the tank inlet 106, and an end of the bypass tube 84. Accordingly, the switch valve 86 directs the flow of refrigerant flowing from the heat exchanger core 82 towards either the receiver tank 80 or the bypass tube 84. The switch valve 86 may also be a bimetallic valve, thermostat, thermostatic expansion valve or pressure sensitive valve, which provide a similar functionality but does not have to be controlled by the controller 28, thus simplifying the air-conditioning system 2.

During the cooling mode, the controller 28 places the switch valve 86 in an access position, so that the heat exchanger core 82 is communicating with the receiver tank 80. In particular, in the access position, the switch valve 86 opens a passage between the valve passage 112 and the tank inlet 106 of the receiver tank 80, and closes a passage between the valve passage 112 and the bypass tube 84. As a result, as indicated by the arrows in FIG. 4, the refrigerant flows from the primary region 101 of the heat exchanger core 82 into the receiver tank 80, where the refrigerant is separated. The liquid portion of the refrigerant then flows into the secondary region 103 of the heat exchanger core 82, and flows out from the core outlet 98.

Conversely during the heating mode, the controller 28, places the switch valve 86 in a bypass position, so that the heat exchanger core 82 is communicating with the bypass tube 84. In particular, in the bypass position, the switch valve 86 opens the passage between the valve passage 112 and the bypass tube 84, and closes the passage between the valve passage 112 and the receiver tank 80. Accordingly, as indicated by the arrows in FIG. 5, the refrigerant from the primary region 101 of the heat exchanger core 82 flows into the bypass tube 84 and then flows out from the core outlet 98.

The operation of the air-conditioning system 2 during the cooling mode and the heating mode is now described.

During the cooling mode, the controller 28 controls the system 2 such that the refrigerant flows through the vapor compression refrigeration cycle 4 as indicated by the arrows in FIGS. 2 and 4. In particular, the controller 28 controls the electromagnetic valves 16 so that the valve 16 couples the inner condenser 8 to the switching heat exchanger 30 and opens the EM valves 18, 22 and closes the EM valves 24. In addition, the controller 28 sets the switch valve 86 to the access position to couple the valve passage 112 with the receiver tank 80.

Accordingly, the refrigerant circulating in the compressor 6 flows to the inner condenser 8 where the air from the inner evaporator 10 cools the refrigerant. The refrigerant then flows from the inner condenser 8 to the switching heat exchanger 30 by way of the EM valve 16.

The refrigerant flowing into the core inlet 96, flows through the section 88*a* of the first header tank 88, into the tubes 92 positioned above the first separator 100, and then into the section 90*a* of the second header tank 90. The refrigerant then flows back into the tubes 92 positioned between the first separator 100 and the second separator 102 and enters the section 88*b* of the first header tank 88. As the refrigerant is flowing through the tubes 92 of the primary region 101, the heat exchanger core 82 behaves like a condenser and cools the refrigerant by transferring the heat of the refrigerant to the outside air being blown in by the fan 34.

The refrigerant, which may include a mixture of saturated liquid and vapor, flows into the valve passage 112 of the first header tank 88 and into the tank inlet 106, by way of the switch valve 86. Once in the receiver tank 80, the refrigerant separates into vapor and liquid portions. The refrigerant, which may now only include the liquid portion, may then flow into the section 88*c* via the sub-cool passage 110 of the first header tank 88. From the first header tank 88, the refrigerant flows into the tubes 92 positioned below the second separator 102 and the third separator 104 (i.e., the secondary region 103), where the refrigerant is further cooled. The refrigerant then flows into the section 90*b* of the second header tank 90 and flows out from the core outlet 98.

The cooled refrigerant from the switching heat exchanger 30 then flows to the thermal expansion valve 12 by way of the EM valve 22 and the second check valve 38. The thermal expansion valve 12 decompresses and expands the refrigerant. The low pressure refrigerant then flows into the inner evaporator 10 where the refrigerant absorbs the heat from the air being blown by the blower 44, thereby cooling the air passing through the inner evaporator 10. The cooled air may then pass through the air passages 52, 54, 56 and into the passenger cabin of the vehicle.

After flowing through the inner evaporator 10, the refrigerant which is heated by the air and may include both liquid and vapor form, flows into the accumulator 40 via the thermal expansion valve 12. The accumulator 40 separates the liquid and vapor form of the refrigerant, and the vapor form of the refrigerant is then sucked by the compressor 6 where it is again compressed.

During the heating mode, the controller 28 controls the air-conditioning system 2 such that the refrigerant flows through the vapor compression refrigeration cycle 4 as indicated by the arrows in FIGS. 3 and 5. In particular, the controller 28 controls the EM valve 16, so that the EM valve 16 couples the inner condenser 8 with the fixed throttle 14, and opens the EM valves 18, 24 and closes the EM valves 22. In addition, the controller 28 sets the switch valve 86 to the bypass position to couple the valve passage 112 with the bypass tube 84.

Accordingly, the refrigerant circulating in the compressor 6 flows into the inner condenser 8 where the air from the inner evaporator 10 cools the refrigerant. In particular, the inner condenser 8 transfers the heat from the refrigerant flowing therein to the air passing through, thereby warming the air flowing through the heated air passage 52. The warmed air then passes through the PTC heater 48 and into the mixed air passage 56 where the air is adjusted to the desired temperature before being blown into the passenger cabin of the vehicle.

By way of the EM valve 16, the refrigerant flows from the inner condenser 8 to the fixed throttle 14 where it is decompressed. The low pressure refrigerant then flows into the switching heat exchanger 30 by way of the EM valve 18.

The refrigerant flows from the fixed throttle 14 to the core inlet 96 of the switching heat exchanger 30. It then flows through the section 88a of the first header tank 88, into the tubes 92 positioned above the first separator 100, and then into the section 90a of the second header tank 90. The refrigerant may then flow back into the tubes 92 positioned between the first separator 100 and the second separator 102 and enter the section 88b of the first header tank 88. As the refrigerant is flowing through the tubes 92 of the primary region 101, the heat exchanger core 82 behaves like an evaporator, and evaporates the refrigerant by absorbing the heat of the air being blown in by the fan 34, thereby heating the refrigerant.

The refrigerant, which may include a mixture of saturated liquid and vapor, flows into the valve passage 112 of the first header tank 88, and then to the bypass tube 84 by way of the switch valve 86. As a result, the refrigerant bypasses the receiver tank 80 and the secondary region 103 of the heat exchanger core 82, and instead flows through the bypass tube 84 and out through the core outlet 98.

After flowing through the switching heat exchanger 30, the refrigerant flows to the accumulator 40 by way of the EM valve 24 and the first check valve 32. The accumulator 40 separates the liquid and vapor form of the refrigerant, and the vapor form of the refrigerant is then sucked by the compressor 6, where it is again compressed and sent through the vapor compression refrigeration cycle 4.

Based on the foregoing, the air-conditioning system 2 utilizes the switching heat exchanger 30 as an outer heat exchanger for a heat pump system. In particular, in the cooling mode the switching heat exchanger 30 operates as a sub-cool condenser as the refrigerant flows through the primary region 101, the receiver tank 80, and the secondary region 103, thereby improving the cooling performance of the system 2.

By bypassing the receiver tank 80 and the secondary region 103 during the heating mode, the switching heat exchanger 30 operates like an outer evaporator, and the air-conditioning system 2 experiences little to no pressure drop across the switching heat exchanger 30. The air-conditioning system 2 of the present disclosure realizes the energy efficiency and performance of both a system having a sub-cool type of condenser and a heat pump system.

Although the switching heat exchanger 30 of the present disclosure is described in association with a non-reverse flow heat pump system, the switching heat exchanger 30 may also be adapted for a reverse flow type heat pump system.

The following embodiments provide variations of the switching heat exchanger 30 of the first embodiment. The operation of the air-conditioning system 2 in the cooling mode and heating mode is substantially the same as described above for the first embodiment.

Figure 6:
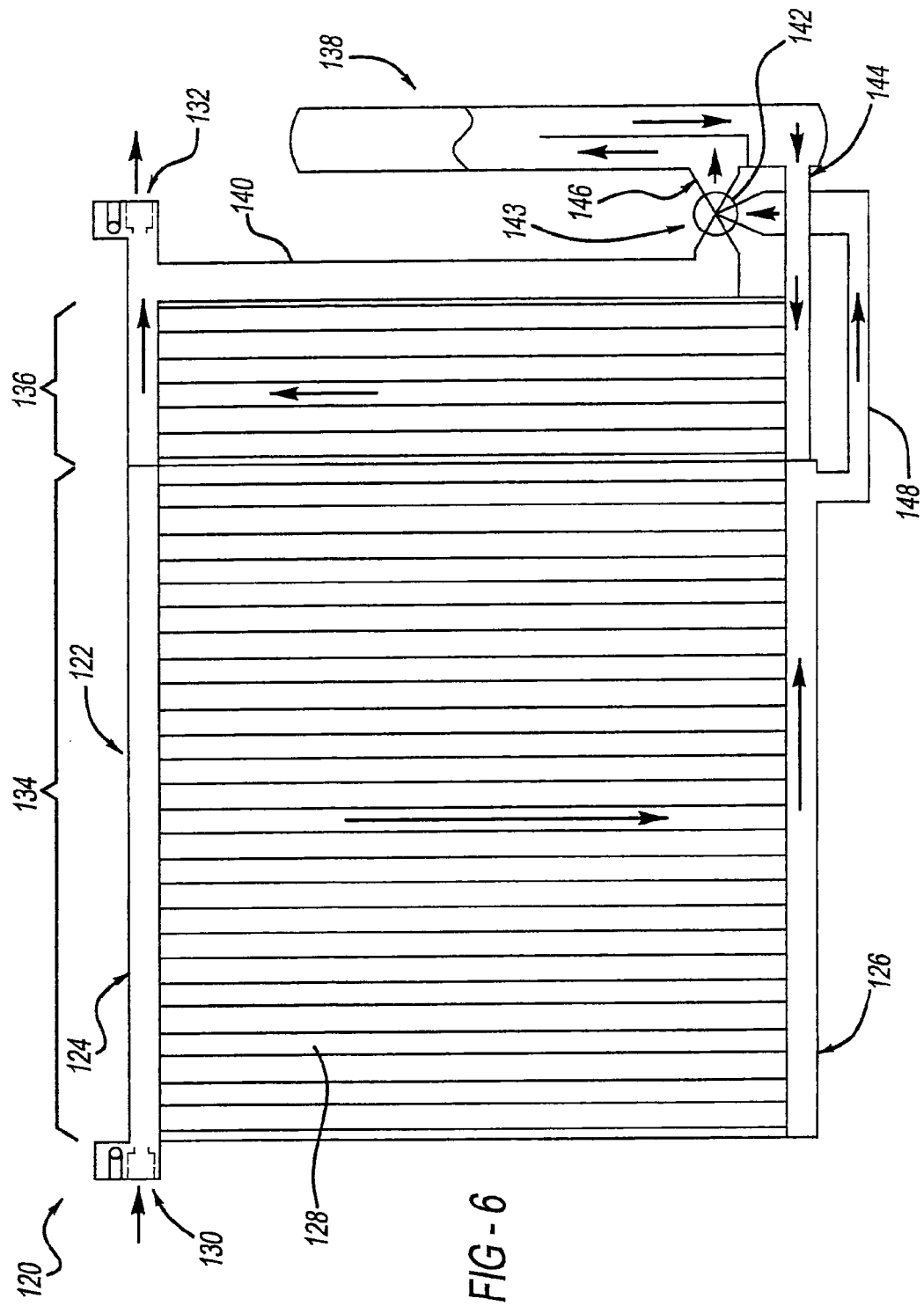
FIG. 6 is a perspective view of a switching heat exchanger in a second embodiment during the cooling mode of the air-conditioning system.
Figure 7:
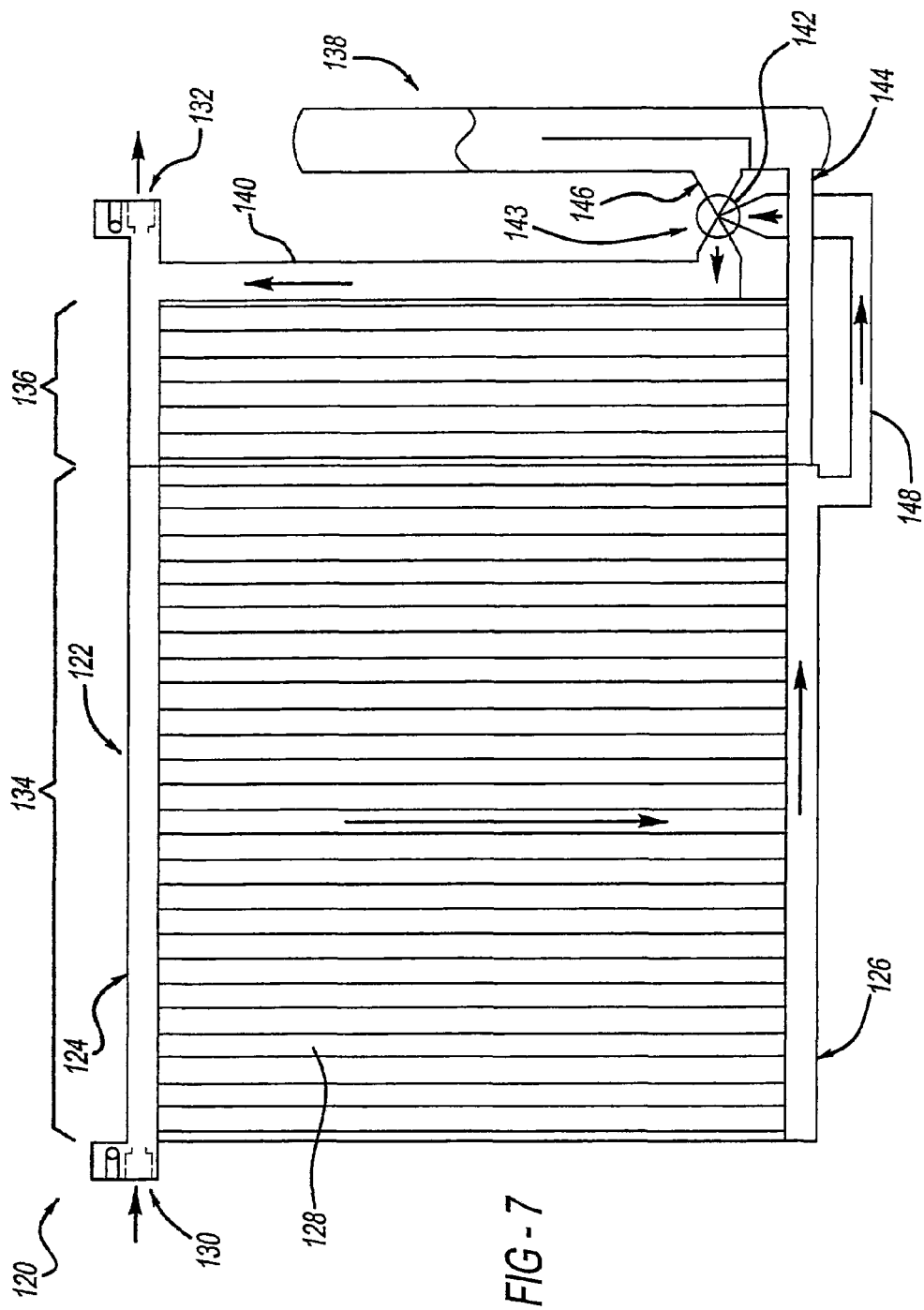
FIG. 7 is a perspective view of the switching heat exchanger of the second embodiment during the heating mode of the air-conditioning system.

With reference to FIGS. 6 and 7, in a second embodiment of the present disclosure, the air-conditioning system 2 includes a switching heat exchanger 120. The switching heat exchanger 120 includes a vertical heat exchanger core 122 having a top header tank 124 and a bottom header tank 126. A plurality of vertical flat tubes 128 are disposed vertically between the top header tank 124 and the bottom header tank 126. Similar to the first embodiment, corrugated fins (not shown) are disposed between the vertical flat tubes 128 in a heat transferring relationship.

The top header tank 124 has a core inlet 130 disposed at one end and a core outlet 132 disposed at another end. The refrigerant flowing into the core inlet 130 flows between the top header tank 124 and the bottom header tank 126 through the vertical flat tubes 128 in a serpentine fashion.

The switching heat exchanger 120 includes at least two separators to separate the vertical heat exchanger core 122 into a primary region 134 and a secondary region 136.

The switching heat exchanger 120 further includes a receiver tank 138, a bypass tube 140, and a switch valve 142. The receiver tank 138 and the bypass tube 140 may be arranged near the secondary region 136 and in parallel with the vertical flat tubes 128.

Similar to the first embodiment, an outlet 144 of the receiver tank 138 is coupled to the secondary region 136, and the switch valve 142 is disposed at a junction 143 between an inlet 146 of the receiver tank 138, one end of the bypass tube 140, and the primary region 134 of the vertical heat exchanger core 122. In particular, an extending portion 148 of the bottom header tank 126 may extend from the primary region 134 to the junction 143.

During the cooling mode the controller 28 places the switch valve 142 in an access position to open a passage between the primary region 134 and the inlet of the receiver tank 138, and to close a passage between the primary region 134 and the bypass tube 140. Therefore, the primary region 134 is in communication with the receiver tank 138.

As a result, as indicated by the arrows in FIG. 6, the refrigerant flows into the core inlet 130 from the inner condenser 8, and then into the primary region 134 of the vertical heat exchanger core 122. From the extending portion 148 of the bottom header tank 126, the refrigerant flows into the receiver tank 138 where the refrigerant is separated. The liquid portion of the refrigerant then flows into the secondary region 136, and flows out from the core outlet 132.

Conversely, with reference to FIG. 7, during the heating mode the controller 28 places the switch valve 142 in a bypass position to open the passage between the primary region 134 and the bypass tube 140, and to close the passage between the primary region 134 and the receiver tank 138. Therefore, the primary region 134 is in communication with the bypass tube 140.

Accordingly, as indicated by the arrows in FIG. 7, the refrigerant flows into the core inlet 130 from the fixed throttle 14, and then into the primary region 134 of the vertical heat exchanger core 122. From the extending portion 148 of the bottom header tank 126, the refrigerant flows into the bypass tube 140, and then flows out from the core outlet 132.

The switching heat exchanger 120 of the second embodiment achieves the same benefits as the first embodiment by utilizing a vertical type heat exchanger. By utilizing the vertical heat exchanger core, the switching heat exchanger 120 may achieve benefits commonly associated with a vertical type heat exchanger core. For example, vertical flat tubes may allow flat type pipes which may have a shorter length. Such configuration may reduce a pressure drop across the heat exchanger. Furthermore, the vertical tubes may allow water to drain from the tubes during the heat mode. For example, ice may form on the tubes during the heating mode. As the ice thaws, the water drains faster off of vertical tubes than of horizontal tubes.

Figure 8:
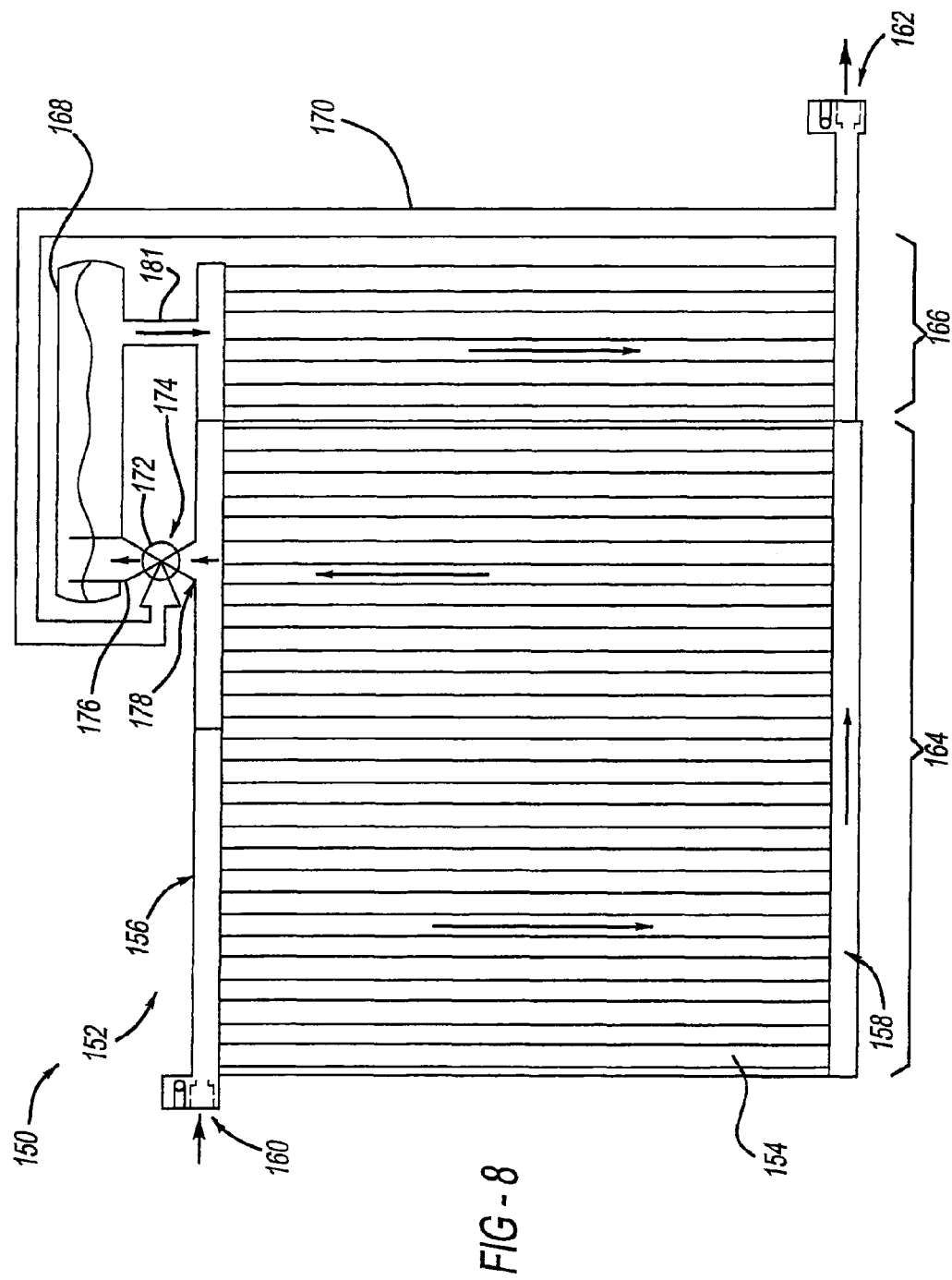
FIG. 8 is a perspective view of a switching heat exchanger in a third embodiment during the cooling mode of the air-conditioning system.
Figure 9:
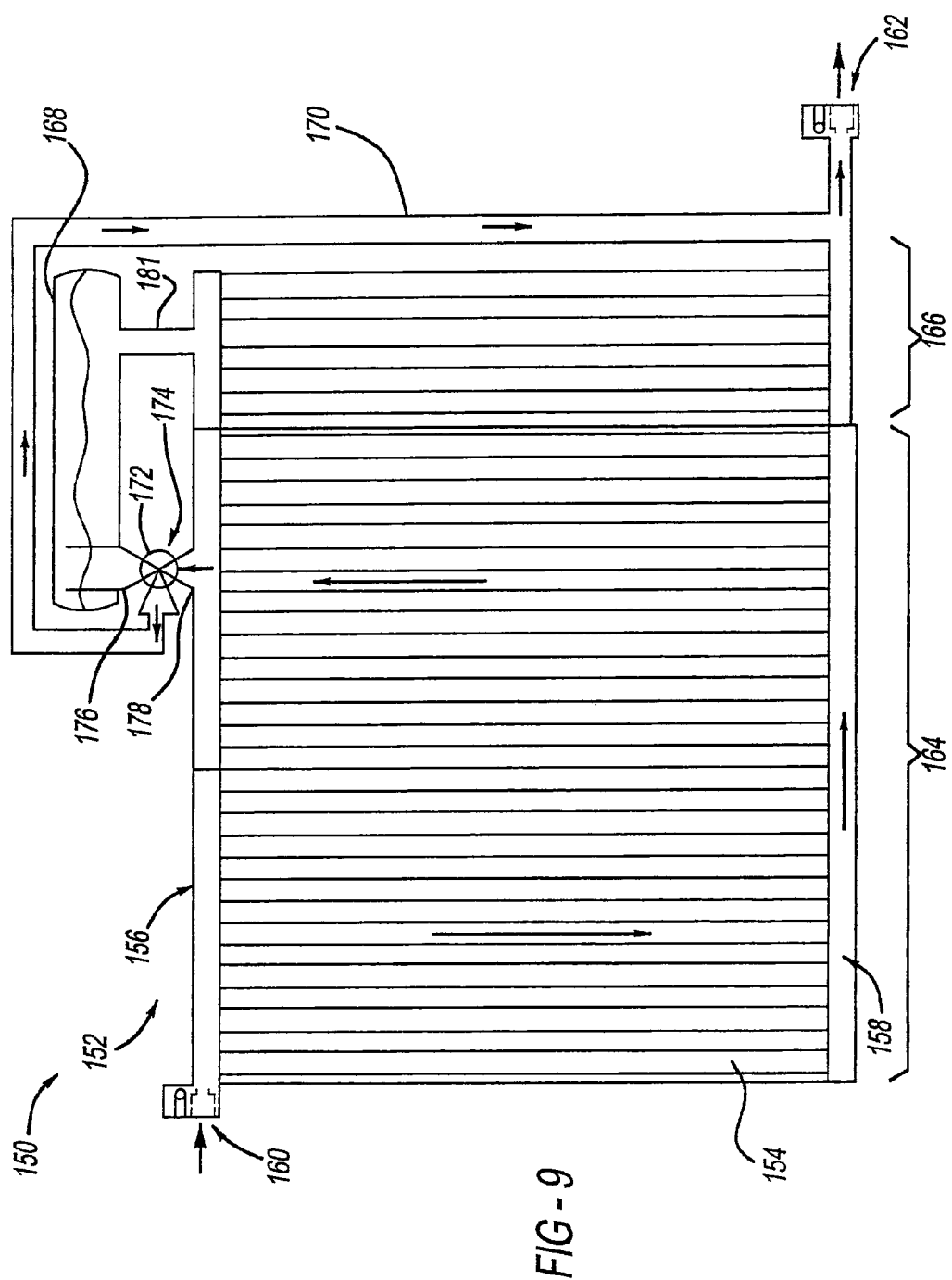
FIG. 9 is a perspective view of the switching heat exchanger of the third embodiment during the heating mode of the air-conditioning system.

With reference to FIGS. 8 and 9, in the third embodiment of the present disclosure, the air-conditioning system 2 includes a switching heat exchanger 150. The switching heat exchanger 150 is configured to utilize dead space typically available above the switching heat exchanger 150 when the outer heat exchanger is disposed in the vehicle.

The switching heat exchanger 150 includes a vertical heat exchanger core 152, which is similar to the second embodiment. The vertical heat exchanger core 152 includes a plurality of vertical flat tubes 154 disposed vertically between a top header tank 156 and a bottom header tank 158.

The top header tank 156 may have a core inlet 160 disposed at one end and the bottom header 158 tank may have a core outlet 162 disposed at an end opposite to the core inlet 160. The refrigerant flowing into the core inlet 160 flows between the top header tank 156 and the bottom header tank 158 through the vertical flat tubes 154 in a serpentine fashion and exits out of the core outlet 162.

Similar to the previous embodiments, the switching heat exchanger 150 includes at least two separators to separate the vertical heat exchanger core 152 into a primary region 164 and a secondary region 166.

The switching heat exchanger 150 further includes a receiver tank 168, a bypass tube 170, and a switch valve 172. The receiver tank 168 may be arranged near the top header tank 156, and is configured such that it is substantially parallel with the length of the top header tank 156 and the length of the bottom header tank 158.

The bypass tube 170 extends from the bottom header tank 158 up to the top header tank 156 where it meets at a junction 174 between an inlet 176 of the receiver tank 168 and a valve passage 178 defined by the top header tank 156.

Similar to the previous embodiments, the inlet 176 of the receiver tank 168 is coupled to the primary region 164 and an outlet 181 of the receiver tank 168 is coupled to the secondary region 166. Also, the switch valve 172 is disposed at the junction 174 between the inlet 176 of the receiver tank 168, an end of the bypass tube 170, and the primary region 164 of the vertical heat exchanger core 152. In particular, the primary region 164 may be in communication with the switch valve 172 by way of the valve passage 178 defined at the top header tank 156.

During the cooling mode, the controller 28 places the switch valve 172 in an access position to open the passage between the primary region 164 and the inlet 176 of the receiver tank 168, and to close the passage between the primary region 164 and the bypass tube 170. Accordingly, the primary region 164 is in communication with the receiver tank 168 during the cooling mode. As a result, as indicated by the arrows in FIG. 8, the refrigerant flows from the primary region 164 of the vertical heat exchanger core 152 into the receiver tank 168 where the refrigerant is separated. The liquid portion of the refrigerant then flows into the secondary region 166 and flows out from the core outlet 162.

Conversely, with reference to FIG. 9, during the heating mode, the controller 28 places the switch valve 172 in the bypass position to open the passage between the primary region 164 of the vertical heat exchanger core 152 and the bypass tube 170, and to close the passage between the primary region 164 and the receiver tank 168. Therefore, the primary region 164 is in communication with the bypass tube 170. Accordingly, as indicated by the arrows in FIG. 9, the refrigerant flows from the primary region 164 into the bypass tube 170, and then flows out from the core outlet 162.

The switching heat exchanger 150 of the third embodiment achieves the same benefits as the first and second embodiments. Specifically, during the cooling mode, the switching heat exchanger 150 operates like a sub-cool condenser, and in the heating mode it operates like an evaporator. In addition, by having the receiver tank 168 arranged above the top header tank 156, the exchanger 150 is able to utilize dead space, thereby improving the configuration of the air-conditioning system 2.

Figure 10:
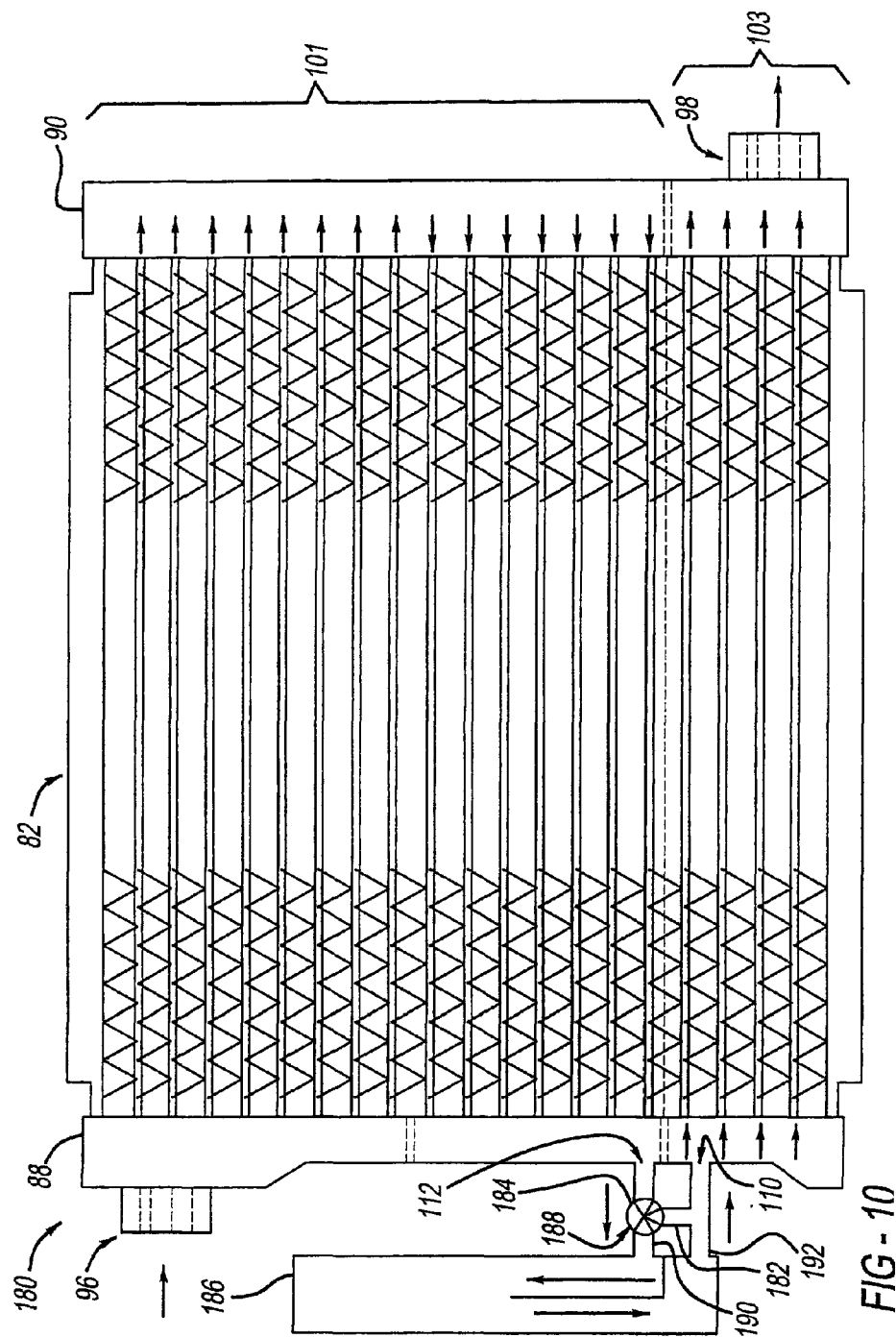
FIG. 10 is a perspective view of a switching heat exchanger in a fourth embodiment during the cooling mode of the air-conditioning system.
Figure 11:
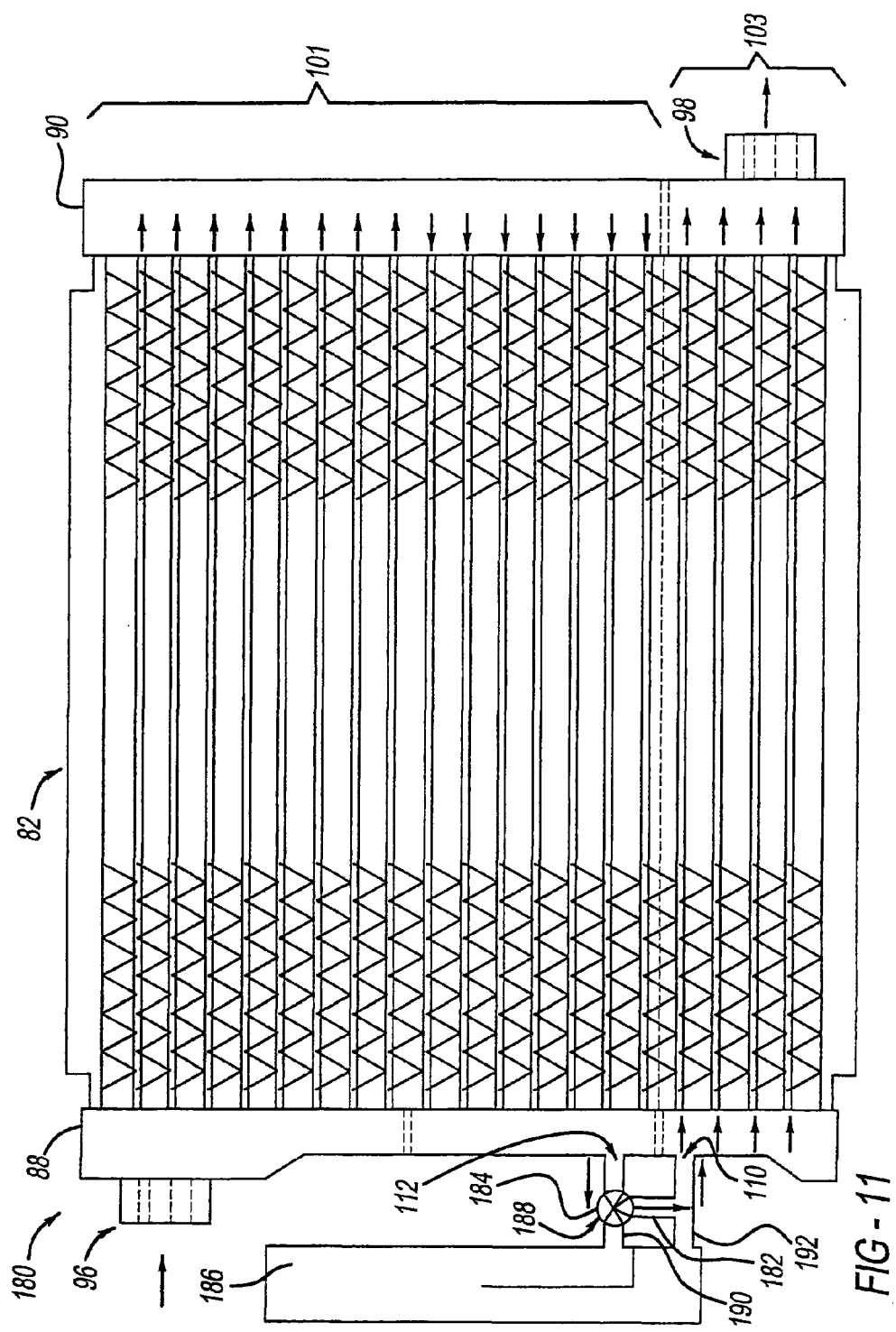
FIG. 11 is a perspective view of the switching heat exchanger of the fourth embodiment during the heating mode of the air-conditioning system.

With reference to FIGS. 10 and 11, in a fourth embodiment of the present disclosure, the air-conditioning system 2 includes a switching heat exchanger 180. The switching heat exchanger 180 of the fourth embodiment is similar to the switching heat exchanger 30 of the first embodiment. In particular, the switching heat exchanger 180 includes the heat exchanger core 82 of the first embodiment.

Unlike the previous embodiment, the switching heat exchanger 180 does not include a lengthy bypass tube that couples the primary region 101 to the core outlet 98. Instead, the exchanger 180 includes a bypass tube 182 that couples the primary region 101 with the secondary region 103 by way of a switch valve 184 to bypass a receiver tank 186.

In particular, the switch valve 184 is disposed at a junction 188 between a tank inlet 190 of the receiver tank 186, the valve passage 112 of the primary region 101, and an end of the bypass tube 182. The other end of the bypass tube 182 is coupled to a tank outlet 192 of the receiver tank 186, thereby communicating with the secondary region 103.

The outlet 192 of the receiver tank 186 is coupled to the sub-cool passage 110. In FIGS. 10 and 11, the bypass tube 182 couples to the tank outlet 192 of the receiver tank 186 to communicate with the sub-cool passage 110. Alternatively, the bypass tube 182 may extend so that it is parallel with the tank outlet 192, having its end coupled to the sub-cool passage 110.

During the cooling mode, the controller 28 places the switch valve 184 in an access position to open a passage between the primary region 101 and the inlet 190 of the receiver tank 186, and to close a passage between the primary region 101 and the bypass tube 182. Accordingly, during the cooling mode, the primary region 101 is in communication with the receiver tank 186.

As a result, as indicated by the arrows in FIG. 10, the refrigerant flows from the primary region 101 of the heat exchanger core 82 into the receiver tank 186 where the refrigerant is separated. The liquid portion of the refrigerant then flows into the secondary region 103 and flows out from the core outlet 98. Similar to the previous embodiments, the switching heat exchanger 180 behaves like a sub-cool condenser during the cooling mode.

Conversely, with reference to FIG. 11, during the heating mode, the controller 28 places the switch valve 184 in a bypass position to open the passage between the primary region 101 and the bypass tube 182, and to close the passage between the primary region 101 and the receiver tank 186. Therefore, during the heating mode, the primary region 101 is in communication with the secondary region 103 by way of the bypass tube 182.

As a result, as indicated by the arrows in FIG. 11, the refrigerant flows form the primary region 101 into the bypass tube 182, into the secondary region 103 by way of the tank outlet 192, and then flows out from the core outlet 98. Similar to the previous embodiments, the switching heat exchanger 180 behaves like an evaporator during the heating mode.

The switching heat exchanger 180 of the fourth embodiment removes the lengthy bypass tube of the first, second, and third embodiments which reduces the cost of the switching heat exchanger 180, and, ultimately, the air-conditioning system 2. It may be noted that, a small pressure drop may be experienced when the refrigerant flows from the primary region 101 to the secondary region 103. However, in bypassing the receiver tank 186 during the heat mode, the refrigerant remains in both liquid and vapor form as it flows through the secondary region and into the accumulator 40, where the vapor is separated from the liquid.

Although the switch valve has been described as being disposed at an inlet of the receiver tank, the switching heat exchanger may also be configured to have the switch valve disposed at an outlet of the receiver tank. An example of such a configuration is provided in a fifth embodiment of the present disclosure in which a switching heat exchanger 200 is configured to have a switch valve 202 disposed at a tank outlet 204 of a receiver tank 205.

By way of example, a valve passage 206 is coupled to a tank inlet 208 of the receiver tank 205. The switch valve 202 is disposed at a junction 210 between the tank outlet 204 of the receiver tank 205, a sub-cool passage 212 of the heat exchanger core 214, and one end of a bypass tube 216.

Figure 12:
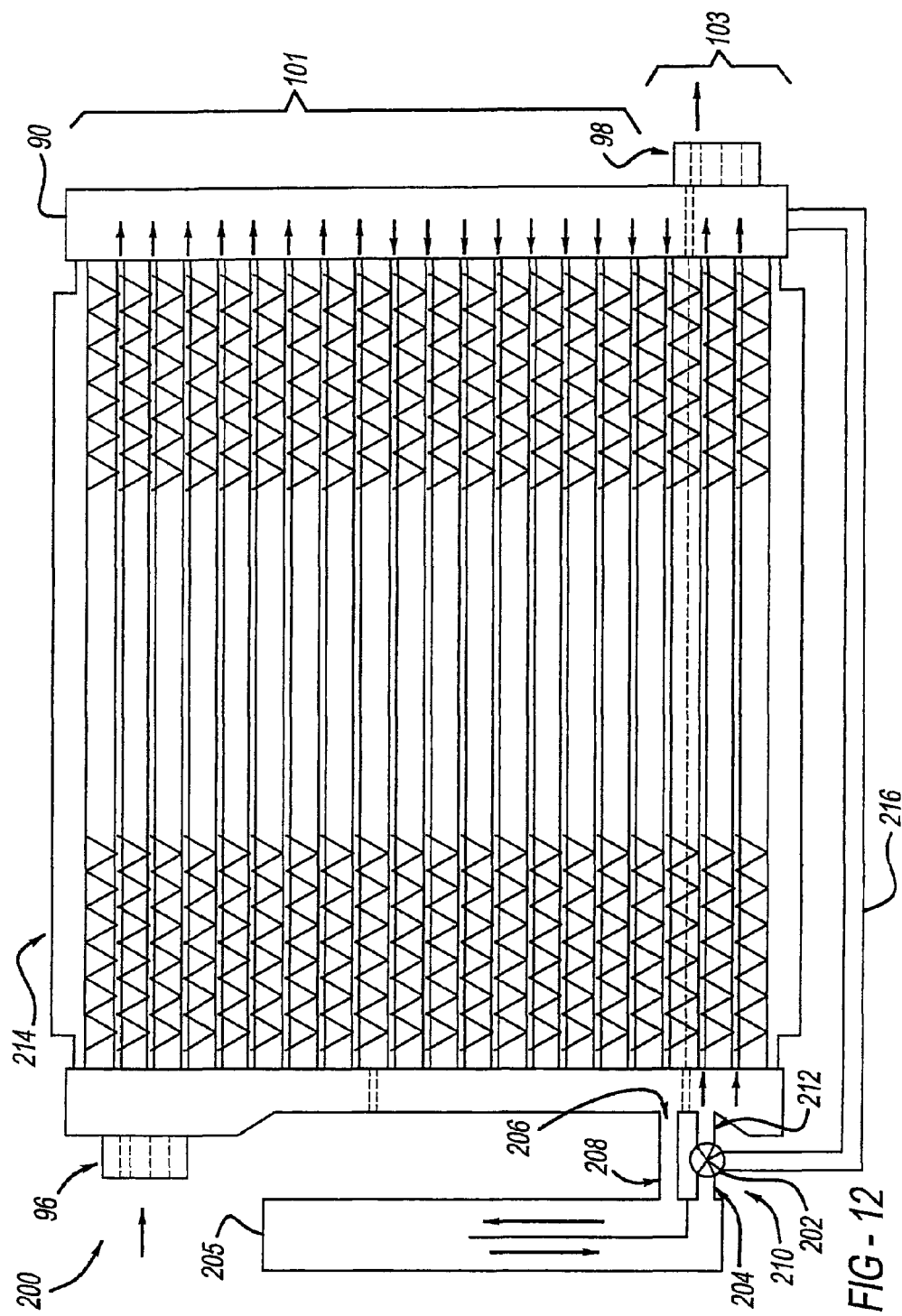
FIG. 12 is a perspective view of a switching heat exchanger in a fifth embodiment during the cooling mode of the air-conditioning system.

During the cooling mode, the controller 28 places the switch valve 202 in an access position to open a passage between the secondary region 103 and the tank outlet 204 of the receiver tank 205, and to close a passage between the tank outlet 204 and the bypass tube 216. Therefore, the receiver tank 205 is in communication with the secondary region 103. Accordingly, as shown by the arrows in FIG. 12, the refrigerant flows from the primary region 101 into the receiver tank 205, then into the secondary region 103, where it flows out from the core outlet 98.

Figure 13:
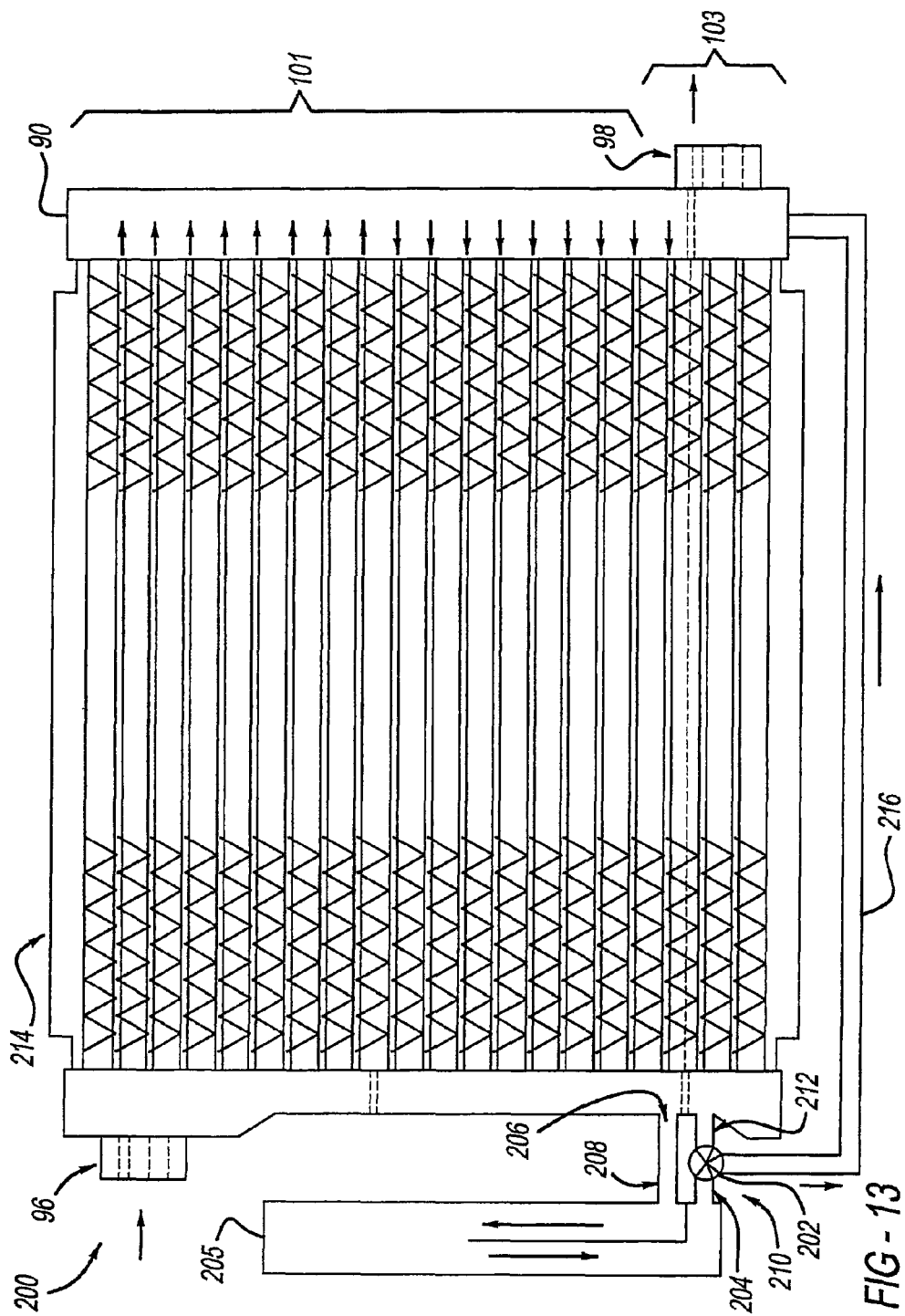
FIG. 13 is a perspective view of the switching heat exchanger of the fifth embodiment during the heating mode of the air-conditioning system.

Conversely, during the heating mode, the controller 28 places the switch valve 202 in a bypass position to open the passage between the tank outlet 204 and the bypass tube 216, and to close the passage between the secondary region 103 and the tank outlet 204. Therefore, the receiver tank 205 is in communication with the bypass tube 216. Accordingly, as indicated by the arrows in FIG. 13, the refrigerant flows from the primary region 101 into the receiver tank 205, then into the bypass tube 216, and flows out from the core outlet 98, thereby bypassing the secondary region 103.

When comparing the fourth and fifth embodiments, the switching heat exchanger 200 of the fifth embodiment reduces the pressure drop across the switching heat exchanger during the heating mode. In particular, the refrigerant bypasses the secondary region 103 via the bypass tube 216 during the heating mode.

In the previous embodiments the switch valve of the switching heat exchanger is provided as a three-way valve, and is disposed at a junction between the receiver tank, the heater core, and the bypass valve. Alternatively, the switch valve can be a two-way valve, which can be cheaper than a three-way valve, to control the flow of refrigerant leaving an outlet of the switching heat exchanger.

During the heating mode, the air-conditioning system 2 may utilize less refrigerant than during the cooling mode. As a result, the excess refrigerant typically available during the heating mode needs to be stored in the air-conditioning system 2. Conventionally, excess refrigerant is stored in the accumulator 40. However, the excess refrigerant may be too much for the accumulator 40, thereby overflowing the accumulator 40. To prevent the accumulator 40 from overflowing, the switch valve of the switching heat exchanger can be disposed at a position between the receiver tank and the outlet of the switching heat exchanger, so that excess refrigerant flowing in the air-conditioning system 2 can be substantially retained by the switching heat exchanger.

Figure 14A:
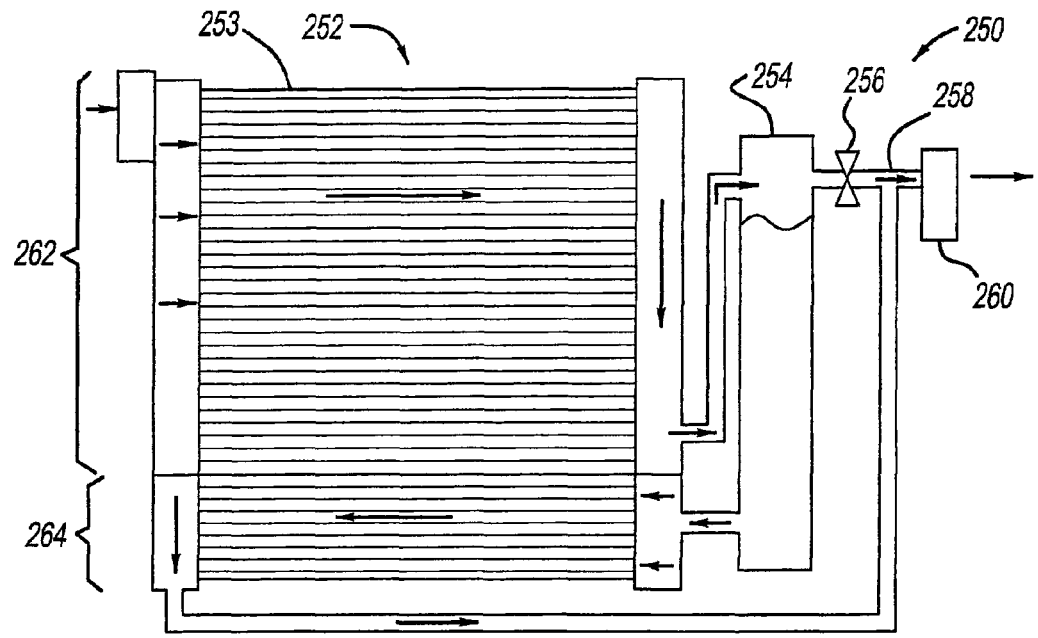
FIGS. 14A and 14B are perspective views of a switching heat exchanger in a sixth embodiment of the air-conditioning system during the cooling mode and the heating mode, respectively.
Figure 14B:
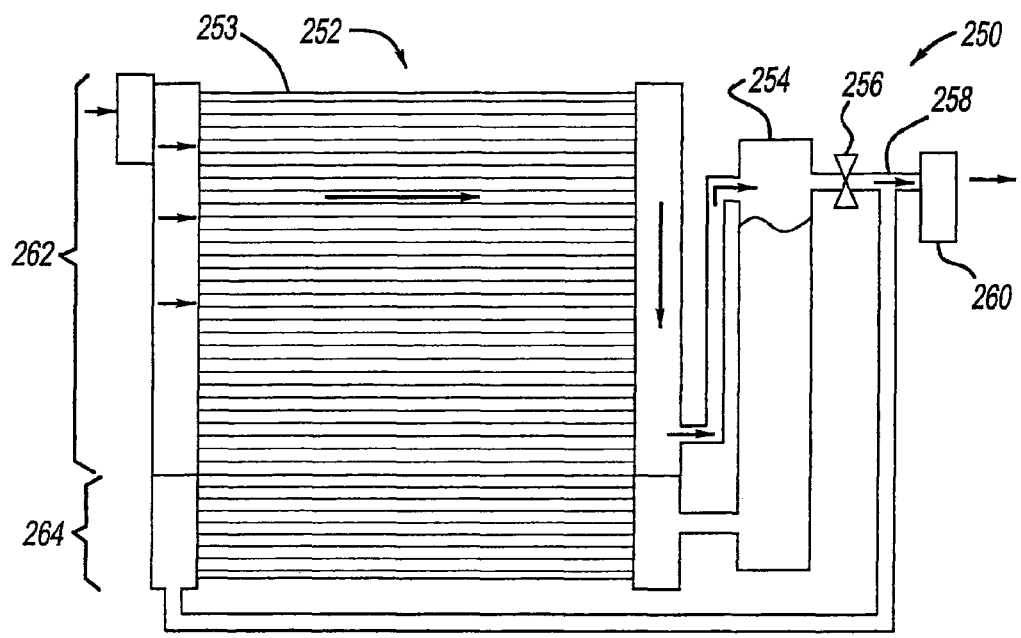

For instance, in FIGS. 14A and 14B, a switching heat exchanger 250 in a sixth embodiment includes a heat exchanger core 252, a receiver tank 254, a switch valve 256, a bypass tube 258, and an outlet 260. Similar to the previous embodiments, the heat exchanger core 252 can be a horizontal type heat exchanger having horizontal tubes 253, and includes a primary region 262 and a secondary region 264 that are separated by a plurality of separators. The receiver tank 254 is coupled to the heat exchanger core 252, such that an inlet of the receiver tank 254 is coupled to the primary region 262 and an outlet of the receiver tank 254 is coupled to the secondary region 264. The bypass tube 258 may extend from the receiver tank 254 to the outlet 260 of the switching heat exchanger 250. The switch valve 256 is disposed along the bypass tube 258, and can be a two-way valve.

During the cooling mode, the controller 28 places the switch valve 256 in an access position to close a passage between the receiver tank 254 and the outlet 260 defined by the bypass tube 258. As a result, as indicated by the arrows in FIG. 14A, the refrigerant flows from the primary region 262 to the receiver tank 254 where the refrigerant is separated into liquid and vapor form. The liquid form of refrigerant may then flow into the secondary region 264, and flow out from the switching heat exchanger 250 via the outlet 260. A substantial amount of the vapor form of refrigerant may be retained by the receiver tank 254 since the passage to the outlet 260 is closed.

During the heating mode, the controller 28 places the switch valve 256 in a bypass position to open the passage between the receiver tank 254 and the outlet 260. Accordingly, as indicated by the arrows in FIG. 14B, the refrigerant flows from the primary region 262 to the receiver tank 254 where the vapor form of refrigerant flows out from the outlet 260 to the accumulator 40 of the air-conditioning system 2. A significant amount of the liquid refrigerant can be held in the receiver tank 254 and the secondary region 264 during the heating mode.

Figure 15A:
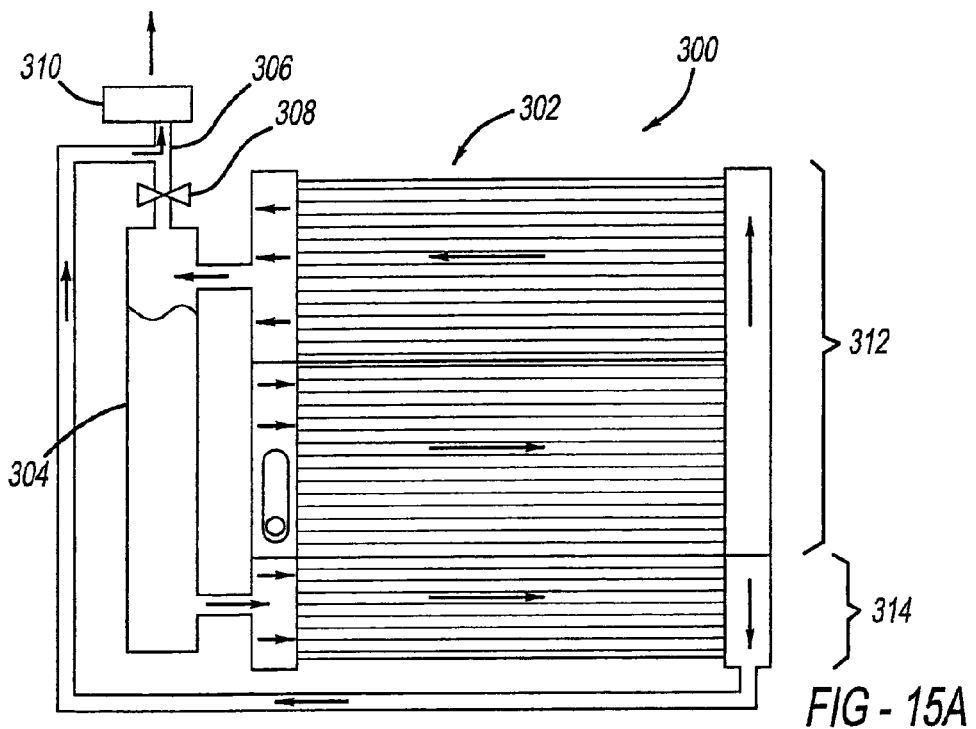
FIGS. 15A and 15B are perspective views of a switching heat exchanger in a seventh embodiment of the air-conditioning system during the cooling mode and the heating mode, respectively.
Figure 15B:
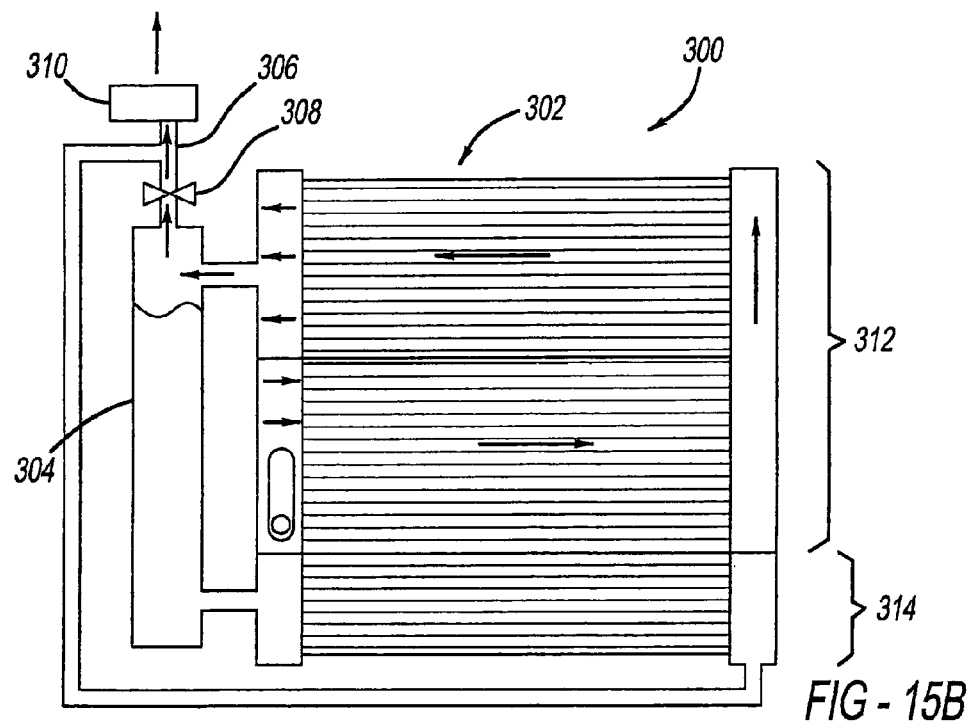

In another configuration, the air-conditioning system 2 can include a switching heat exchanger 300 of a seventh embodiment as shown in FIGS. 15A and 15B. The switching heat exchanger 300 includes a heat exchanger core 302, a receiver tank 304, a bypass tube 306, a switch valve 308, and an outlet 310. Similar to the previous embodiments, the heat exchanger core 302 includes a primary region 312 and a secondary region 314, which are separated by a plurality of separators. The receiver tank 304 is coupled to the heat exchanger core 302 such that an inlet of the receiver tank 304 is coupled to the primary region 312 and an outlet of the receiver tank 304 is coupled to the secondary region 314. The bypass tube 306 can be coupled between the receiver tank 304 and the outlet 310. The switch valve 308 is disposed along the bypass tube 306 to open or close a passage defined by the bypass tube 306.

During the cooling mode, the controller 28 places the switch valve 308 in an access position to close the passage between the receiver tank 304 and the outlet 310 formed by the bypass tube 306. Accordingly, as indicated by the arrows in FIG. 15A, the refrigerant flows from the primary region 312 to the receiver tank 304, where it is separated. The liquid form of refrigerant flows into the secondary region 314 and then flows out from the switching heat exchanger 300 via the outlet 310. A substantial amount of the vapor form of refrigerant may be retained by the receiver tank 254 since the passage to the outlet 310 is closed During the heating mode, the controller 28 places the switch valve 308 in a bypass position to open the passage between the receiver tank 304 and the outlet 310, thereby allowing the refrigerant to flow from the receiver tank 304 to the outlet 310. For instance, as indicated by the arrows in FIG. 15B, the refrigerant flows from the primary region 312 to the receiver tank 304 where the liquid form of refrigerant may be retained by the receiver tank 304 and the secondary region 314, and the vapor form of refrigerant may flow out from the switching heat exchanger 300 via the outlet 310.

The switching heat exchanger (250, 300) of the sixth and seventh embodiments, may utilize a two-way valve as the switch valve (256, 308). By arranging the switch valve (256, 308) along the bypass tube (258, 306), the passage from the receiver tank (254, 304) directly to the outlet (260, 310) can be controlled to permit the flow of refrigerant during the heating mode and to prevent the flow of refrigerant during the cooling mode.

Furthermore, by arranging the bypass tube at an upper portion of the receiver tank (254, 304), which typically holds the vapor form of refrigerant, the switching heat exchanger (250, 300) can provide the vapor form of refrigerant to the accumulator 40 and retain most of the liquid form of refrigerant during the heating mode. Therefore, the air-conditioning system 2 utilizes the receiver tank (254, 304) and/or the secondary region (264, 314) of the switching heat exchanger core (250, 300) as a storage area for the excess refrigerant, thereby preventing the accumulator 40 from overflowing.

Figure 16A:
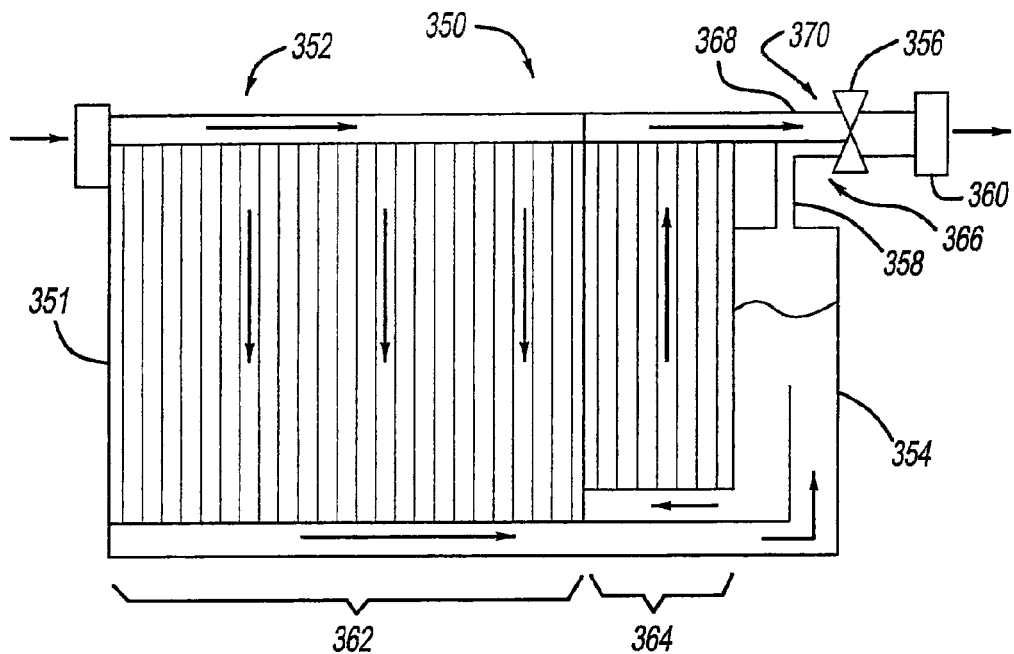
FIGS. 16A and 16B are perspective views of a switching heat exchanger in an eighth embodiment of the air-conditioning system during the cooling mode and the heating mode, respectively.
Figure 16B:
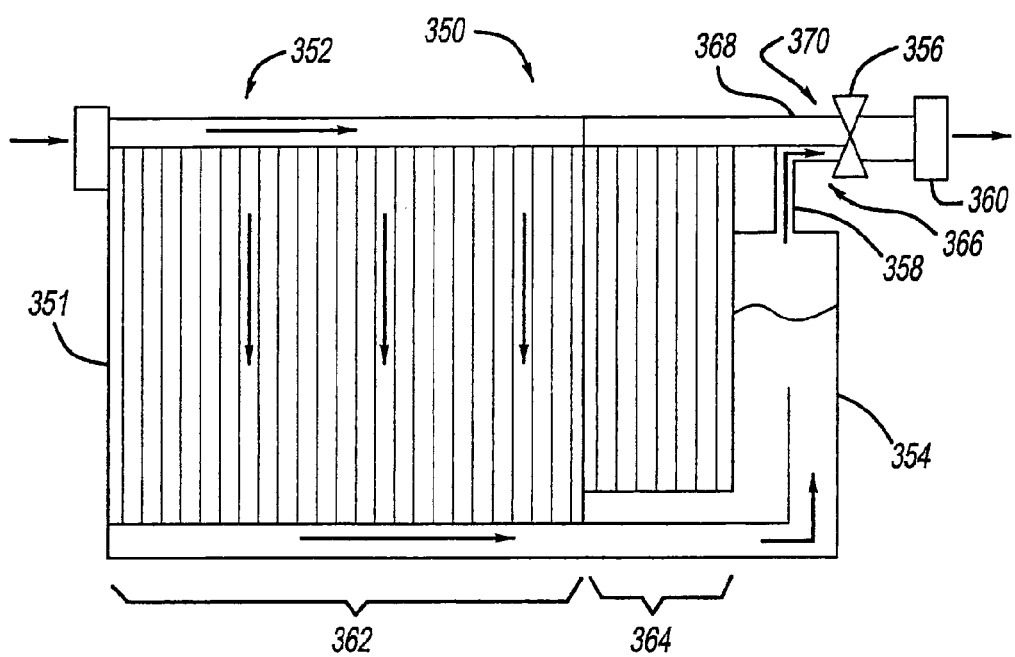

As a two-way valve, the switch valve can open and close a flow path. In the sixth and seventh embodiments, the switch valve (256, 308) is arranged to just open and close the flow path defined by the bypass tube (258,306). Thus, during the heating mode liquid refrigerant, which may flow to the receiver tank (254, 304) and the secondary region (264, 314), may flow into the air-conditioning system 2 via the outlet (260,310). To prevent such flow of liquid refrigerant, the air-conditioning system 2 of the present disclosure can include a switching heat exchanger 350 shown in FIGS. 16A and 16B in an eighth embodiment.

The switching heat exchanger 350 includes a heat exchanger core 352, a receiver tank 354, a switch valve 356, a bypass tube 358, and an outlet 360. The heat exchanger core 352 can be a vertical type heat exchanger having a plurality of vertical tubes 351. The receiver tank 354 is coupled to the heat exchanger core 352 such that an inlet of the receiver tank 354 is coupled to a primary region 362 and an outlet of the receiver tank 354 is coupled to a secondary region 364.

The outlet 360 of the switching heat exchanger 350 can be coupled to two parallel passages that provide a flow path for the refrigerant. A first passage 370 can be defined by an exit channel 368 which couples the secondary region 364 of the heat exchanger core 352 to the outlet 360. The exit channel 368 may be an extension of a top header tank of the heat exchanger core 352. A second passage 366 can be defined by the bypass tube 358 which couples the receiver tank 354 and the outlet 360. The first passage 370 and the second passage 366 can be arranged to be parallel to each other.

The switch valve 356 can be arranged to control the flow of refrigerant to the outlet 360 from the first passage 370 and the second passage 366. The switch valve 356, which can be a two-way valve, is configured to open one flow path while blocking another. For instance, during the cooling mode, the controller 28 places the switch valve 356 in an access position to open the first passage 370 formed between the secondary region 364 and the outlet 360 by the exit channel 368. By opening the first passage 370, the switch valve 356 closes the second passage 366 formed between the receiver tank 354 and the outlet 360 by the bypass tube 358. Accordingly, as indicated by the arrows in FIG. 16A, the refrigerant flows from the primary region 362 to the receiver tank 354, where the refrigerant is separated. The refrigerant may then flow into the secondary region 364 and flow out from the outlet 360 via the first passage 370.

During the heating mode, the controller 28 places the switch valve 356 in a bypass position to open the second passage 366 formed between the receiver tank 354 and the outlet 360 by the bypass tube 358. By opening the second passage 366, the switch valve 356 closes the first passage 370 formed between the secondary region 364 and the outlet 360 by the exit channel 368. Accordingly, as indicated by the arrows in FIG. 16B, the refrigerant flows from the primary region 362 to the receiver tank 354, which separates the refrigerant, and the refrigerant, which can substantially be in a vapor form, can flow out from the outlet 360 via the second passage 366. The liquid form of refrigerant can be retained in the receiver tank 354 and the secondary region 364, and is blocked from entering the air-conditioning system 2 via the first passage 370 by the switch valve 356.

By having the switch valve 356 arranged along the first passage 370 and the second passage 366, the switching heat exchanger 350 controls the flow of refrigerant entering the accumulator 40 of the air-conditioning system 2. In the cooling mode, refrigerant, which may substantially be in liquid form, flows out from the outlet 360 after flowing through the secondary region 364. Whereas in the heating mode, refrigerant, which may substantially be in vapor form, bypasses the secondary region 364 and flows out from the outlet 360.

Figure 17A:
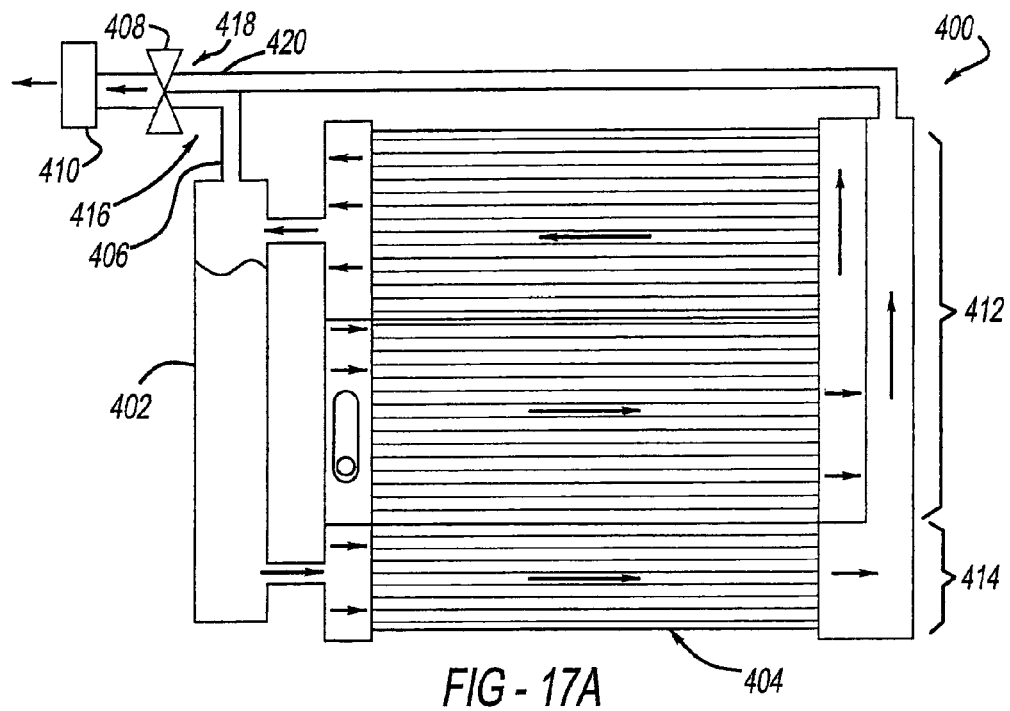
FIGS. 17A and 17B are perspective views of a switching heat exchanger in a ninth embodiment of the air-conditioning system during the cooling mode and the heating mode, respectively.
Figure 17B:
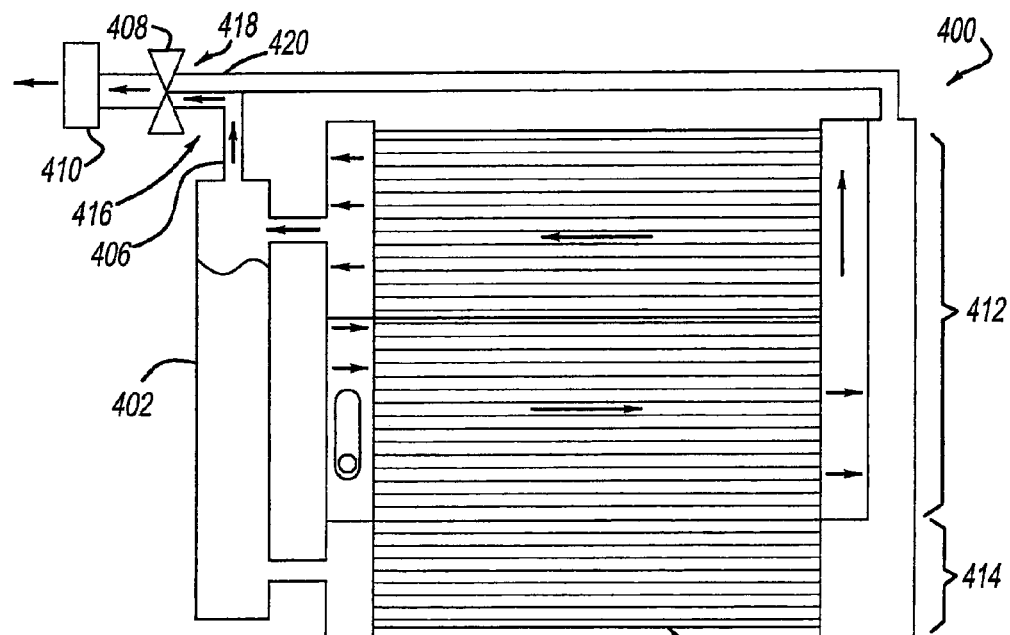

The switching heat exchanger 350 of the eighth embodiment utilizes a vertical type heat exchanger as the heat exchanger core 352. In a ninth embodiment of the present disclosure, a switching heat exchanger 400, shown in FIGS. 17A and 17B, utilizes a horizontal type of heat exchanger as a heat exchanger core 404, and includes a switch valve 408 for controlling the flow of refrigerant to an outlet 410. Similar to the previous embodiments, a receiver tank 402 is coupled to the heat exchanger core 404 such that an inlet of the receiver tank 402 is coupled to a primary region 412 and an outlet of the receiver tank 402 is coupled to a secondary region 414. A bypass tube 406 is configured between the receiver tank 402 and the outlet 410.

Similar to the eighth embodiment, the outlet 410 of the switching heat exchanger 400 can be coupled to two parallel passages that provide a flow path for the refrigerant. A first passage 418 can be formed by an exit channel 420 which couples the secondary region 414 and the outlet 410. A second passage 416 can be formed by the bypass tube 406, which couples the receiver tank 402 and the outlet 410. The first passage 418 and the second passage 416 can be arranged to be parallel to each other.

The switch valve 408 can be arranged to control the flow of refrigerant to the outlet 410 from the first passage 416 and the second passage 418. As a two-way valve, the switch valve 408 can be configured to open one flow path while blocking another. For instance, during the cooling mode, the controller 28 places the switch valve 408 in an access position to open the first passage 418 formed between the secondary region 414 and the outlet 410 by the exit channel 420. By opening the first passage 418, the switch valve 408 closes the second passage 416. Accordingly, as indicated by the arrows in FIG. 17A, the refrigerant flows from the primary region 412 of the heat exchanger core 404 to the receiver tank 402, then the secondary region 414, and flows out from the switching heat exchanger 400 via the outlet 410.

During the heating mode, the controller 28 places the switch valve 408 in a bypass position to open the second passage 416 formed between the receiver tank 402 and the outlet 410 by the bypass tube 406, and, thus, closes the first passage 418. Accordingly, as indicated by the arrows shown in FIG. 17B, the refrigerant flows from the primary region 412 to the receiver tank 402, where the refrigerant flows out from the outlet 410. Since the bypass tube 406 is arranged at a top portion of the receiver tank 402, the vapor form of refrigerant flows through the outlet 410. Furthermore, a substantial portion of the liquid form of refrigerant remains in the receiver tank 402 and the secondary region 414, and is blocked from flowing through the outlet 410 via the first passage 418 by the switch valve 408.

According to the configuration of the switching heat exchanger 400 of the ninth embodiment, during the cooling mode, refrigerant, which may substantially be in liquid form, flow through the secondary region 414 before flowing out from the outlet 410. Whereas in the heating mode, refrigerant, which may substantially be in vapor form, bypasses the secondary region 364 and flows out from the outlet 360. Such control of the refrigerant is achieved using a two-way valve as the switch valve, which can be cheaper and less complex than a three-way valve.

Figure 18A:
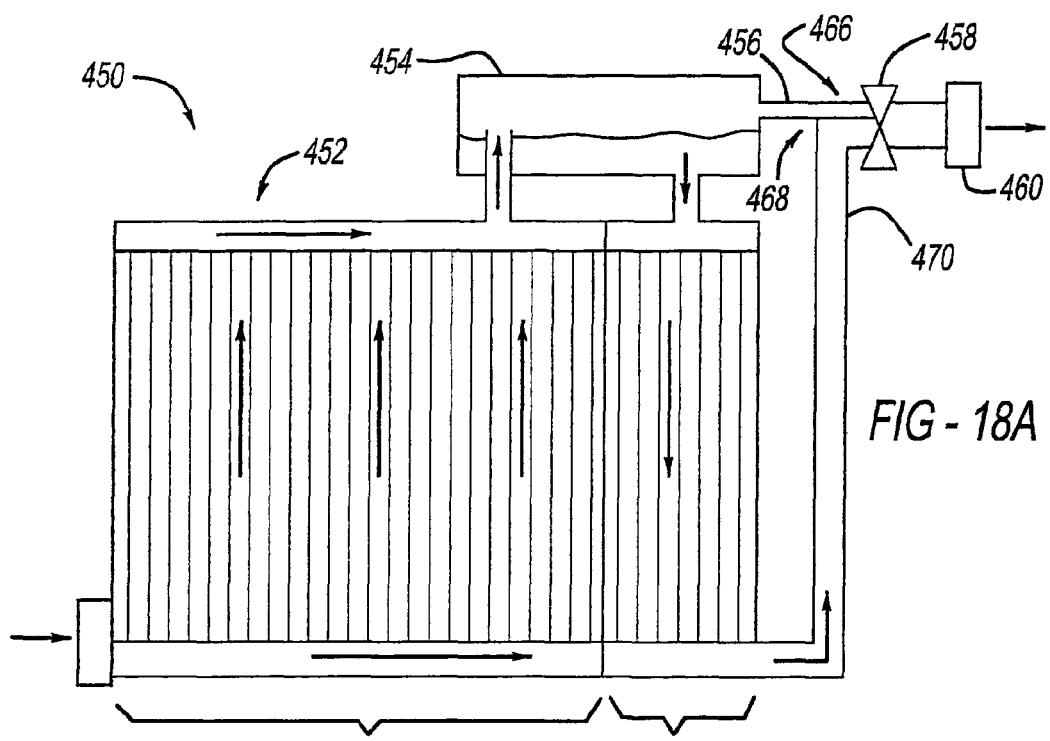
FIGS. 18A and 18B are perspective views of a switching heat exchanger in a tenth embodiment of the air-conditioning system during the cooling mode and the heating mode, respectively.
Figure 18B:
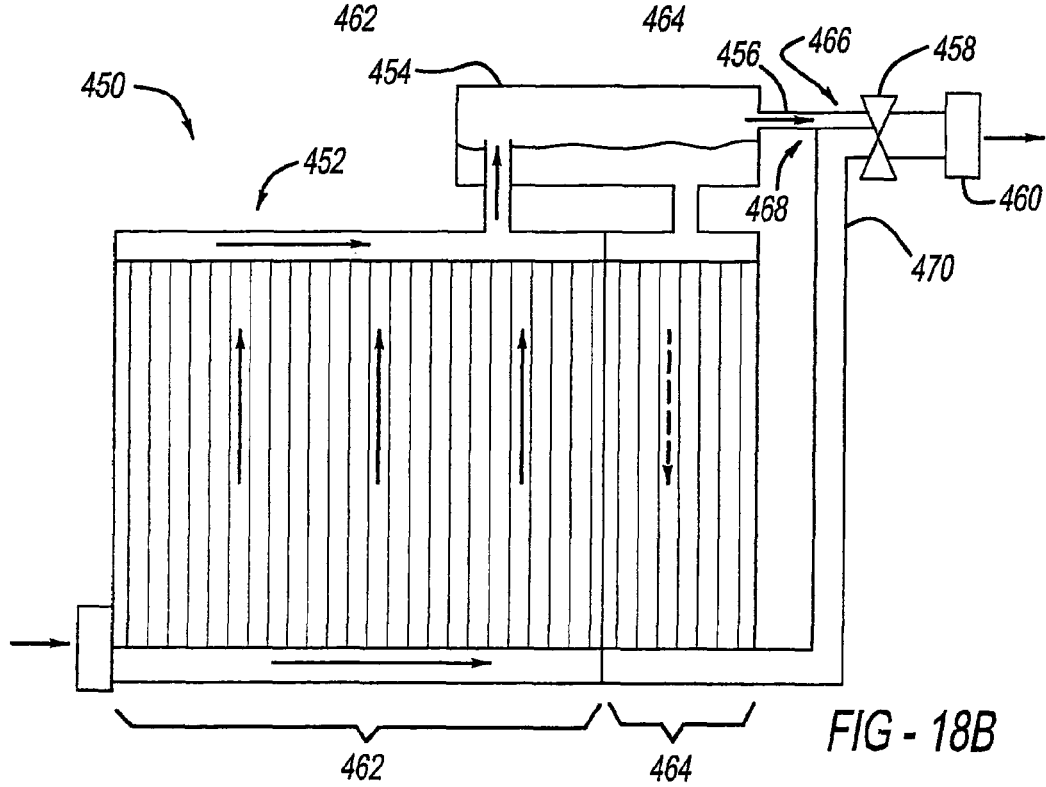

The switching heat exchanger (350, 400) of the eighth and ninth embodiments have the receiver tank (354, 403) positioned along a side of the heat exchanger core (352, 404). In a tenth embodiment of the present disclosure, as shown in FIGS. 18A and 18B, a switching heat exchanger 450 has a receiver tank 454 arranged along a top or upper side of a heat exchanger core 452 to utilize dead space typically available above the switching heat exchanger 450 when it is assembled in the vehicle. Such configuration is similar to the switching heat exchanger 150 of the third embodiment.

The receiver tank 454 is coupled to the heat exchanger core 452 such that an inlet of the receiver tank 454 is coupled to a primary region 462, and an outlet of the receiver tank 454 is coupled to a secondary region 464. A bypass tube 456 is coupled between the receiver tank 454 and an outlet 460.

The outlet 460 of the switching heat exchanger 450 can be coupled to two parallel passages that provide a flow path for the refrigerant. A first passage 468 can be formed by an exit channel 470, which couples the secondary region 464 and the outlet 460. A second passage 466 can be formed by the bypass tube 456, which couples the receiver tank 454 and the outlet 460. The first passage 468 and the second passage 466 can be arranged to be parallel to each other. The switch valve 458 can be arranged to control the flow of refrigerant to the outlet 460 from the first passage 468 and the second passage 466.

During the cooling mode, the controller 28 places the switch valve 458 in an access position to open the first passage 468 provided between the secondary region 464 and the outlet 460 by the exit channel 470, and, thus, closes the second passage 466 provided between the receiver tank 454 and the outlet 460 by the bypass tube 456. Accordingly, as indicated by the arrows in FIG. 18A, the refrigerant flows from the primary region 462 to the receiver tank 454, then to the secondary region 464, and flows out from the outlet 460 of the switching heat exchanger 450.

During the heating mode, the controller 28 places the switch valve 458 in a bypass position to open the second passage 466 formed between the receiver tank 454 and the outlet 460 by the bypass tube 456, thereby closing the first passage 468. Accordingly, as indicated by the arrows in FIG. 18B, the refrigerant flows from the primary region 462 to the receiver tank 454 where the vapor form of the refrigerant flows out from the outlet 460 via the bypass tube 456. The liquid form of refrigerant flows into the receiver tank 454 (as indicated by the dotted arrow in FIG. 18B), and can be stored in the receiver tank 454 and the secondary region 464.

In addition to the benefits achieved by the switching heat exchangers (350, 400) of the eighth and ninth embodiments, the switching heat exchanger 450 of the tenth embodiment may also achieve some of the benefits of the switching heat exchanger 150 of the third embodiment. In particular, by having the receiver tank 454 arranged above a top header tank of the heat exchanger core 452, the switching heat exchanger 450 is able to utilize dead space typically available above the switching heat exchanger 450, thereby improving the configuration of the air-conditioning system 2.

In the eighth to tenth embodiments, the switch valve (356, 408, 458) is arranged along two parallel passages, such that when it opens one passage, it closes the other passage. Per the configuration of the switching heat exchanger (250, 300) of the sixth and seventh embodiments, the switching heat exchanger (250, 300) controls the flow of refrigerant through the outlet (260, 310) by opening or closing the passage formed by the bypass tube (258, 306). However, a passage between the secondary region (264, 314) and the outlet (260, 310) remains open, thereby allowing refrigerant to pass through. As an alternative to the switching heat exchangers (350, 400, 450) of the eighth to tenth embodiments, in an eleventh embodiment of the present disclosure, as shown in FIGS. 19A and 19B, a switching heat exchanger 500 has a switch valve 502 and an outlet 504 positioned above a receiver tank 506 to prevent the liquid form of refrigerant from flowing into the accumulator 40 during the heating mode.

A heat exchanger core 508 of the switching heat exchanger 500 is coupled to the receiver tank 506 such that an inlet of the receiver tank 506 is coupled to a primary region 510, and an outlet of the receiver tank 506 is coupled to a secondary region 512. A bypass tube 514 extends from the receiver tank 506 to the outlet 504 to form a passage therebetween. The switch valve 502 is disposed along the bypass tube 514 to open or close the passage formed by the bypass tube 514 between the receiver tank 506 and the outlet 504.

Similar to the sixth and seventh embodiments, during the cooling mode, the controller 28 places the switch valve 502 in an access position to close the passage formed by the bypass tube 514. Accordingly, as indicated by the arrows in FIG. 19A, the refrigerant flows from the primary region 510 to the receiver tank 506, then flows through the secondary region 512, and out from the outlet 504 of the switching heat exchanger 500.

During the heating mode, the controller 28 places the switch valve 502 in a bypass position to open the passage formed by the bypass tube 514. Accordingly, as indicated by the arrows shown in FIG. 19B, the refrigerant flows from the primary region 510 to the receiver tank 506. From the receiver tank 506, a substantial amount of the vapor form of refrigerant flows out from the outlet 504 via the bypass tube 514; whereas, the liquid form of refrigerant, may collect in the receiver tank 506 and the secondary region 512 (as indicated by the dotted arrow in FIG. 19B).

Per the eleventh embodiment, the switching heat exchanger 500 has the switch valve 502 and the outlet 504 positioned above the receiver tank 506 so that, in the heating mode, the liquid refrigerant collects in the receiver tank 506 and the secondary region 512, thereby removing excess refrigerant from circulation of the air-conditioning system 2.

Figure 20A:
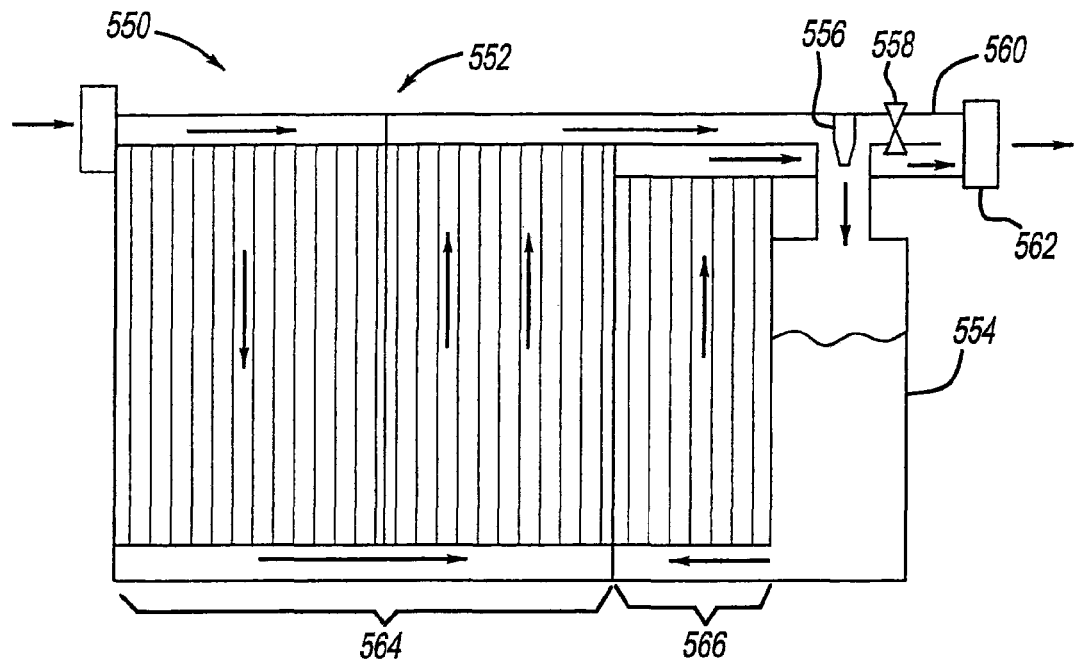
FIGS. 20A and 20B are perspective views of a switching heat exchanger in a twelfth embodiment of the air-conditioning system during the cooling mode and the heating mode, respectively.
Figure 20B:
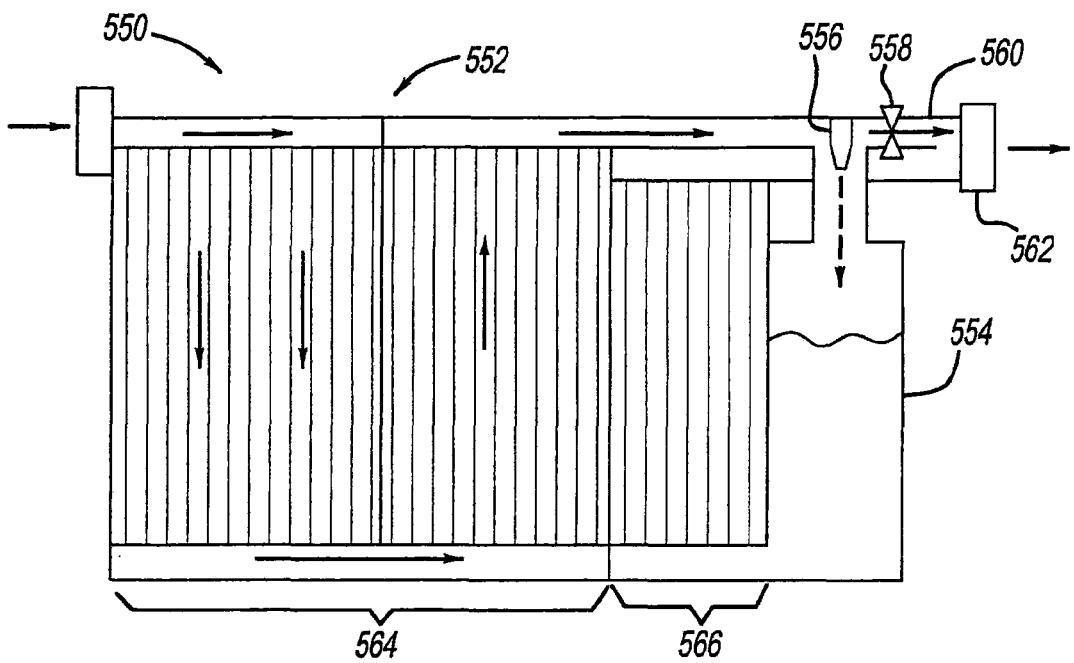

To ensure the separation of the refrigerant in the receiver tank, the switching heat exchanger may include a gas-liquid separator. For instance, with reference to FIGS. 20A and 20B, in a twelfth embodiment of the present disclosure, a switching heat exchanger 550 includes a heat exchanger core 552, a receiver tank 554, a gas-liquid separator 556, a switch valve 558, a bypass tube 560, and an outlet 562. The heat exchanger core 552 is coupled to the receiver tank 554 such that the inlet of the receiver tank 554 is coupled to a primary region 564 and the outlet of the receiver tank 554 is coupled to a secondary region 566. The gas-liquid separator 556 can be disposed at the inlet of the receiver tank 554 to separate the liquid and vapor forms of refrigerant as the refrigerant is flowing through the receiver tank 554. The switch valve 558 can be disposed along the bypass tube 560 at a position between the gas-liquid separator 556 and the outlet 562 of the switching heat exchanger 550.

During the cooling mode, the controller 28 places the switch valve 558 in an access position to close the passage formed by the bypass tube 560 between the receiver tank 554 and the outlet 562. Accordingly, as indicated by the arrows shown in FIG. 20A, the refrigerant flows from the primary region 564 of the heat exchanger core 552 to the receiver tank 554 by way of the gas-liquid separator 556. The gas liquid separator 556 separates the refrigerant as it enters the receiver tank 554. The liquid form of refrigerant flows from the receiver tank 554 to the secondary region 566 and then flows out from the outlet 562 to the accumulator 40 of the air-conditioning system 2. The vapor form of refrigerant may be retained by the receiver tank 554.

During the heating mode, the controller 28 places the switch valve 558 in a bypass position to open the passage formed by the bypass tube 560. Accordingly, as indicated by the arrows shown in FIG. 20B, the refrigerant flows from the primary region 564 to the receiver tank 554 by way of the gas-liquid separator 556. The gas liquid separator 556 separates the refrigerant as it enters the receiver tank 554. Accordingly, the vapor form of refrigerant flows out from the outlet 562 of the switching heat exchanger 550; whereas the liquid form of refrigerant flow into the receiver tank 554 (as indicated by the dotted arrow in FIG. 20B) and can be held by the receiver tank 554 and secondary region 566.

Figure 21A:
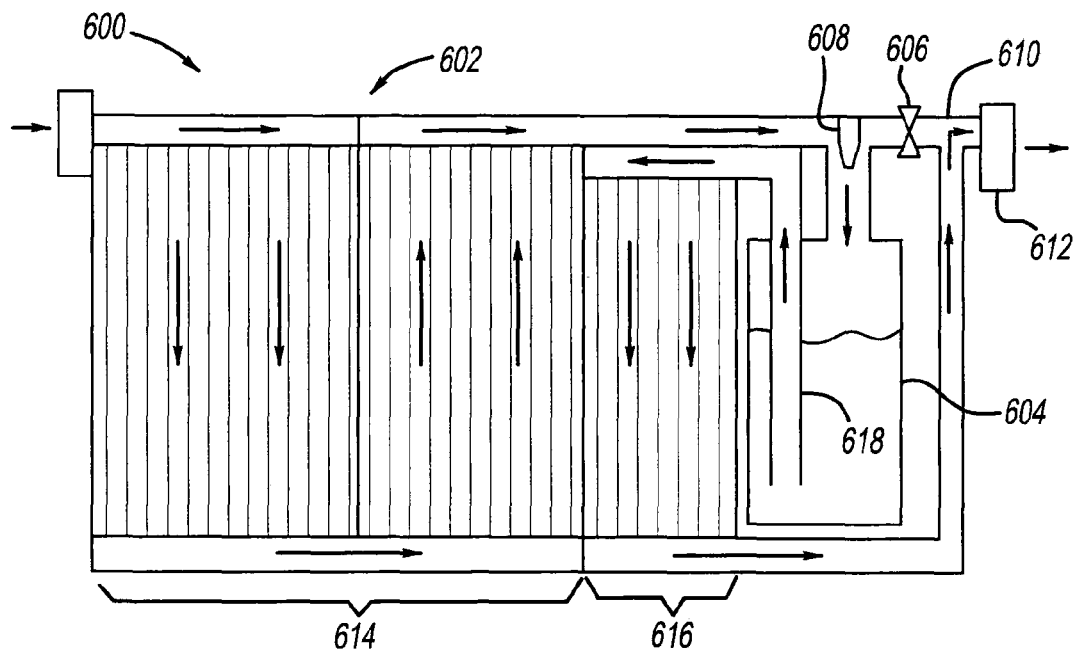
FIGS. 21A and 21B are perspective views of a switching heat exchanger in a thirteenth embodiment of the air-conditioning system during the cooling mode and the heating mode, respectively.
Figure 21B:
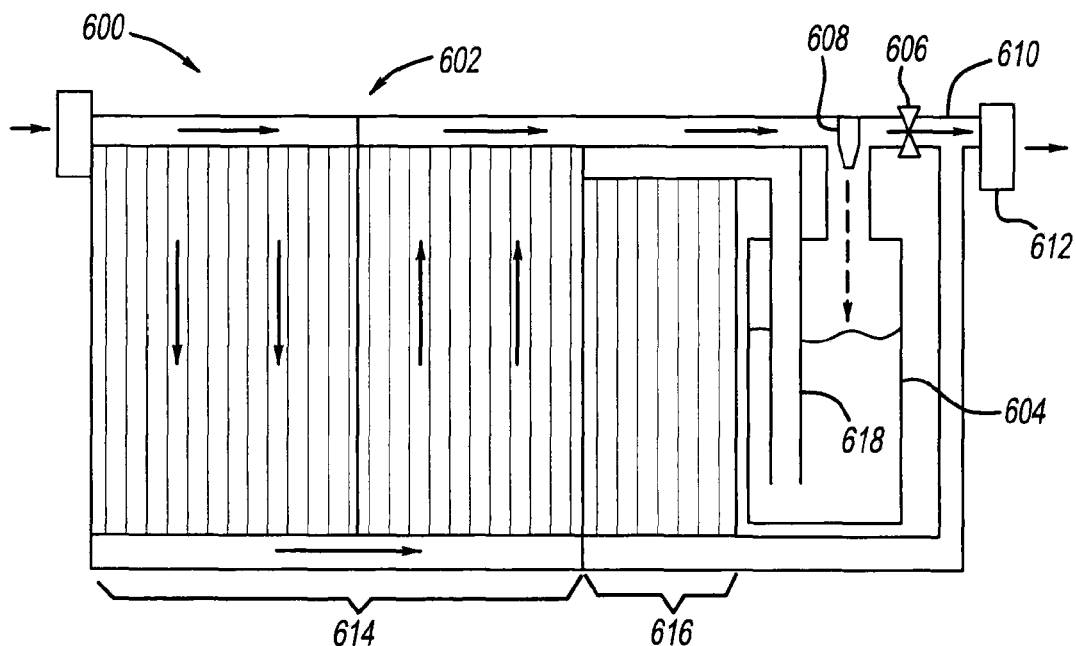

Per the twelfth embodiment, the liquid form of refrigerant may flow to the secondary region 566 and flow out from the outlet 562. In order to retain the liquid form of refrigerant, a switching heat exchanger 600 in a thirteenth embodiment includes a receiver tank 604, as shown in FIGS. 21A and 21B. Specifically, a heat exchanger core 602 is coupled to the receiver tank 604 such that a primary region 614 is coupled to an inlet of the receiver tank 604, and a secondary region 616 is coupled to an outlet of the receiver tank 604 by way of a pipe 618. A bypass tube 610 can extend from the receiver tank 604 to an outlet 612, thereby providing a passage therebetween. A switch valve 606, which may be a two-way valve, can be disposed along the bypass tube 610 to open and close the passage formed. A gas-liquid separator 608 is arranged at the inlet of the receiver tank 604 to separate the vapor and liquid forms of refrigerant entering the receiver tank 604.

The pipe 618 can be configured to have one end extend inside of the receiver tank 604 to a position substantially close to a bottom of the receiver tank 604, and have the other end coupled to the secondary region 616. As known in the art, the vapor form of refrigerant collects at an upper portion of the receiver tank 604, and the liquid form collects at a lower portion of the receiver tank 604. Thus, by having the pipe 618, the liquid form of refrigerant can be provided to the secondary region 616 and the vapor form can remain in the upper portion and/or flow through the bypass tube 610 when the switch valve 606 is open.

During the cooling mode, the controller 28 places the switch valve 606 in an access position to close the passage formed by the bypass tube 610. Accordingly, as indicated by the arrows in FIG. 21A, the refrigerant flows from the primary region 614 to the receiver tank 604 by way of the gas-liquid separator 608. After being separated by the gas-liquid separator 608, the liquid form of refrigerant flows to the secondary region 616 via the pipe 618. From the secondary region 616, the refrigerant flows out from the outlet 612.

During the heating mode, the controller 28 places the switch valve in a bypass position to open the passage formed by the bypass tube 610. Accordingly, as indicated by the arrows in FIG. 21B, the refrigerant flows from the primary region 614 of the heat exchanger core 602 to the receiver tank 604 by way of the gas-liquid separator 608. After being separated by the gas-liquid separator 608, the vapor form of refrigerant flows to the bypass tube 610 and out from the outlet 612. The liquid form of refrigerant may flow into the receiver tank 604 (as indicated by the dotted arrow) where it is held during the heating mode.

The switching heat exchanger 600 of the twelfth embodiment utilizes the gas-liquid separator 608 to separate the refrigerant entering the tanks so that the vapor form of refrigerant can be released via the bypass tube 610 during the heating mode, and the liquid form or refrigerant can be released via the secondary region 616 during the cooling mode. Furthermore, during the heating mode, the receiver tank 604 retains the liquid form of refrigerant, thereby performing like an accumulator and preventing the accumulator 40 from overflowing with excess liquid refrigerant.

Figure 22A:
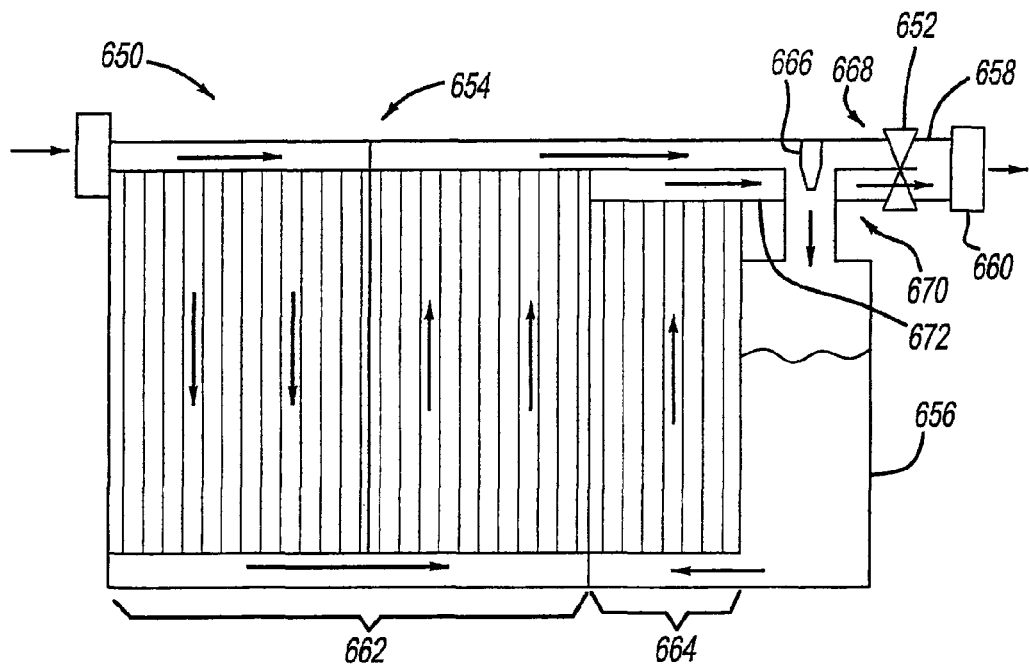
FIGS. 22A and 22B are perspective views of a switching heat exchanger in a fourteenth embodiment of the air-conditioning system during the cooling mode and the heating mode, respectively.
Figure 22B:
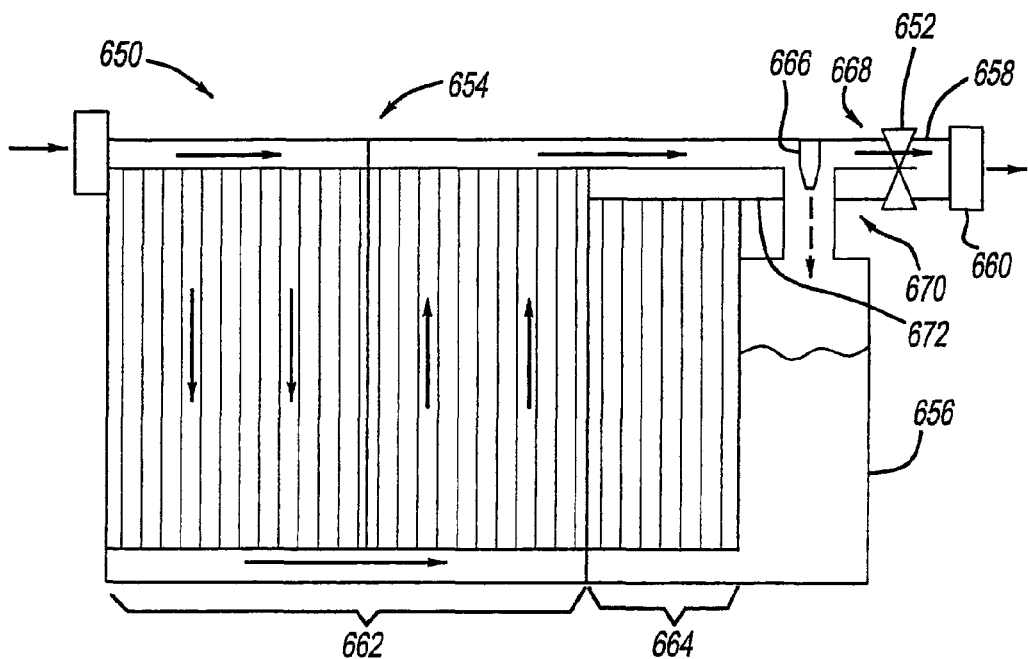

The switching heat exchanger 600 of the thirteenth embodiment may retain a substantial amount of the liquid refrigerant during the heating mode. However, there is a possibility that some of the liquid refrigerant may flow out from the outlet 612. Therefore, in a fourteenth embodiment of the present disclosure, as shown in FIGS. 22A and 22B, a switching heat exchanger 650 utilizes a switch valve 652 for opening one passage and closing another.

In particular, the switching heat exchanger 650 can include a heat exchanger core 654, a receiver tank 656, a bypass tube 658, and an outlet 660. Similar to the previous embodiments, the receiver tank 656 can be coupled to a heat exchanger core 654 such that an inlet of the receiver tank 656 is coupled to a primary region 662 and an outlet of the receiver tank 656 is coupled to a secondary region 664. A gas-liquid separator 666 can be arranged at an inlet of the receiver tank 656 to separate the refrigerant entering the receiver tank 656 from the primary region 662.

The outlet 660 of the switching heat exchanger 650 can be coupled to two parallel passages that provide a flow path for the refrigerant. A first passage 670 can be formed by an exit channel 672, which couples the secondary region 664 and the outlet 660. A second passage 668 can be formed by the bypass tube 658, which couples the receiver tank 656 and the outlet 660. The first passage 670 and the second passage 668 can be arranged to be parallel to each other.

The switch valve 652 can be arranged to control the flow of refrigerant to the outlet 660 from the first passage 670 and the second passage 668. As a two-way valve, the switch valve 652 can be configured to open one flow path while blocking another.

For instance, during the cooling mode, the controller 28 places the switch valve 652 in an access position to open the first passage 670 formed between the secondary region 664 and the outlet 660 by the exit channel 672. By opening the first passage 670, the switch valve 652 closes the second passage 668. Accordingly, as indicated by the arrows in FIG. 22A, the refrigerant flows from the primary region 662 of the heat exchanger core 654 to the receiver tank 656 by way of the gas-liquid separator 666. The gas-liquid separator 666 separates the vapor and liquid forms of the refrigerant as the refrigerant enters the receiver tank 656. From the receiver tank 656, the liquid form of refrigerant flow to the secondary region 664, and flows out from the outlet 660.

During the heating mode, the controller 28 places the switch valve 408 in a bypass position to open the second passage 668 formed between the receiver tank 656 and the outlet 660 by the bypass tube 658, thereby closing the first passage 670. Accordingly, as indicated by the arrows shown in FIG. 22A, the refrigerant flows from the primary region 662 to the receiver tank 656 by way of the gas-liquid separator 666. The gas-liquid separator 666 separates the vapor and liquid forms of the refrigerant as the refrigerant enters the receiver tank 656. From the receiver tank 656, the vapor form of refrigerant flow out from the outlet 660 by way of the bypass tube 658. A substantial portion of the liquid form of refrigerant enters the receiver tank 656 (as indicated by the dotted arrow), and is retained by the receiver tank 656 and the secondary region 664. Specifically, during the heating mode, the liquid form of refrigerant is blocked from flowing through the outlet 660 via the first passage 670 by the switch valve 652.

Based on the fourteenth embodiment, the switching heat exchanger 650 utilizes the gas-liquid separator 666 to separate the refrigerant as it enters the receiver tank 656, and utilizes the switch valve 652 to control the flow of refrigerant to the outlet 660. Thus, during the cooling mode, the liquid form of refrigerant may flow out from the switching heat exchanger 650 after being cooled by the secondary region 664, and the vapor form of refrigerant may be retained in the receiver tank 656. Furthermore, during the heating mode, the vapor form of refrigerant may flow out from the outlet 660 by way of the bypass tube 658, thereby bypassing the secondary region 664. As a result, the liquid form refrigerant is retained in the receiver tank 656 and the secondary region 664, and is prevented from flowing through the outlet 660.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An air-conditioning system for a vehicle comprising:
a switching heat exchanger disposed at a front portion of the vehicle and including a heat exchanger core, a receiver tank, and a switch valve, the heat exchanger core having a primary region and a secondary region, the primary region being before the secondary region, the heat exchanger core exchanging heat between refrigerant flowing therein and air blowing through, an inlet of the receiver tank communicating with the primary region of the heat exchanger core for receiving the refrigerant and an outlet of the receiver tank communicating with the secondary region for providing the refrigerant to the heat exchanger core, the switch valve being arranged between the heat exchanger core and the receiver tank for controlling the flow of the refrigerant from the heat exchanger core to the receiver tank; and a controller configured to control the switch valve to an access position during a cooling mode and a bypass position during a heating mode, wherein in the access position, the switch valve opens a first passage to have the primary region of the heat exchanger core communicating with the receiver tank and the refrigerant flows from the primary region to the receiver tank, from which the refrigerant flows to the secondary region before flowing out from an outlet of the heat exchanger core, and in the bypass position, the switch valve opens a second passage to have the primary region of the heat exchanger core communicate with the outlet of the heat exchanger core and the refrigerant flows from the primary region to the outlet of the heat exchanger core.

2. The air-conditioning system of claim 1, wherein the switching heat exchanger further comprises:

a bypass tube that has one end in communication with the outlet of the heat exchanger core, wherein the switch valve is disposed at a junction between the receiver tank, the other end of the bypass tube, and the primary region of the heat exchanger core, the switch valve, in the access position, opens the first passage defined between the primary region and the receiver tank to have the refrigerant flow from the primary region to the receiver tank, and the switch valve, in the bypass position, opens the second passage defined between the primary region and the bypass tube to have the refrigerant flow from the primary region to the outlet of the heat exchanger core via the bypass tube.

3. The system of claim 1, wherein the switching heat exchanger further comprises:

a bypass tube that has one end in communication with the secondary region of the heat exchanger core, wherein the switch valve is disposed at a junction between the inlet of the receiver tank, the other end of the bypass tube, and the primary region of the heat exchanger core, the switch valve, in the access position, opens the first passage defined between the inlet of the receiver tank and the primary region of the heat exchanger core to have the refrigerant flow from the primary region to the receiver tank, and the switch valve, in the bypass position, opens the second passage defined between the primary region and the bypass tube to have the refrigerant flow from the primary region to the outlet of the heat exchanger core by way of the bypass tube and the secondary region of the heat exchanger core.

4. The air-conditioning system of claim 1, wherein the receiver tank is arranged above the heat exchanger core.

5. The air-conditioning system of claim 1, wherein the switch valve is disposed at an outlet of the receiver tank.

6. The air-conditioning system of claim 1, wherein the switching heat exchanger further comprises:

a bypass tube that has one end in communication with the secondary region of the heat exchanger core, wherein the switch valve is disposed at a junction between an outlet of the receiver tank, the other end of the bypass tube, and the secondary region of the heat exchanger core, the switch valve, in the access position, opens the first passage defined between the outlet of the receiver tank and the secondary region of the heat exchanger core to have the refrigerant provided by the primary region to flow from the receiver tank to the secondary region, from which the refrigerant flows out from the outlet of the heat exchanger core, and the switch valve, in the bypass position, opens a second passage defined between the outlet of the receiver tank and the bypass tube to have the refrigerant provided by the primary region to flow from the receiver tank to the outlet of the heat exchanger core by way of the bypass tube.

7. The air-conditioning system of claim 1 further comprising:

a heat pump system cooling the passenger cabin during the cooling mode and heating a passenger cabin of the vehicle during the heating mode, wherein the switching heat exchanger is disposed in the heat pump system as an outer heat exchanger to operate like a sub-cool condenser during the cooling mode and to operate like an outer evaporator during the heating mode.

* * * * *